(12) United States Patent
Xu et al.

(10) Patent No.: US 10,157,419 B1
(45) Date of Patent: Dec. 18, 2018

(54) MULTI-FACTOR RISK MODELING PLATFORM

(75) Inventors: Andrew Xu, Boston, MA (US); Aaron H. Gao, Ashland, MA (US)

(73) Assignee: FMR LLC, Boston, MA (US)

( * ) Notice: Subject to any disclaimer, the term of this patent is extended or adjusted under 35 U.S.C. 154(b) by 1015 days.

(21) Appl. No.: 13/370,396

(22) Filed: Feb. 10, 2012

(51) Int. Cl.
*G06Q 40/06* (2012.01)
*G06Q 40/00* (2012.01)

(52) U.S. Cl.
CPC .............. *G06Q 40/06* (2013.01); *G06Q 40/00* (2013.01)

(58) Field of Classification Search
CPC ................................ G06Q 40/06; G06Q 40/00
USPC ........................................... 705/35–45, 36 R
See application file for complete search history.

(56) References Cited

U.S. PATENT DOCUMENTS

| | | | |
|---|---|---|---|
| 8,001,032 B2* | 8/2011 | Markov et al. ............. | 705/36 R |
| 8,090,600 B2 | 1/2012 | Ziade et al. | |
| 2004/0186804 A1* | 9/2004 | Chakraborty ........ | G06Q 40/025 |
| | | | 705/36 R |
| 2008/0005007 A1* | 1/2008 | Chen ..................... | G06Q 40/06 |
| | | | 705/36 R |
| 2009/0313180 A1 | 12/2009 | Merkoulovitch et al. .. | 705/36 R |
| 2011/0161245 A1 | 6/2011 | Hollas | |
| 2012/0066151 A1* | 3/2012 | Madhavan et al. ......... | 705/36 R |
| 2012/0072247 A1 | 3/2012 | Rosauer et al. | |

OTHER PUBLICATIONS

Yes, The APT is TestableAuthor(s): Philip H. Dybvig and Stephen A. RossSource: The Journal of Finance, vol. 40, No. 4 (Sep. 1985), pp. 1173-1188.*
Implied ICA Author: Kumiega, Andrew; Neururer, Thaddeus; Van Vliet, Ben Publication info: Journal of Derivatives 19.4: 39(14). Euromoney Trading Limited. (Jul. 2012-Sep. 2012) (Year: 2012).*
Concurrent On-Demand and Batch Based Risk Calculations Aaron H. Gao et al. U.S. Appl. No. 13/370,462, filed Feb. 10, 2012.
Multi-Factor Risk Modeling Aaron H. Gao et al. U.S. Appl. No. 13/370,447, filed Feb. 10, 2012.
Ammann, et al., "VaR for Nonlinear Financial Instruments, Linear Approximation or Full Monte-Carlo?" 2001, Financial Markets and Portfolio Management 15(3).

* cited by examiner

*Primary Examiner* — Richard C Weisberger
(74) *Attorney, Agent, or Firm* — Hanchuk Kheit LLP; Walter G. Hanchuk

(57) ABSTRACT

A high performance platform for execution of a multi-factored risk models is described. The platform calculates risk exposures of investment portfolios in response to market events using metadata risk factor modules. Described are techniques for tracking and editing the metadata risk factor modules. Also described are SQL implemented approaches for aggregating risk exposures and conditional risk simulation techniques.

30 Claims, 13 Drawing Sheets

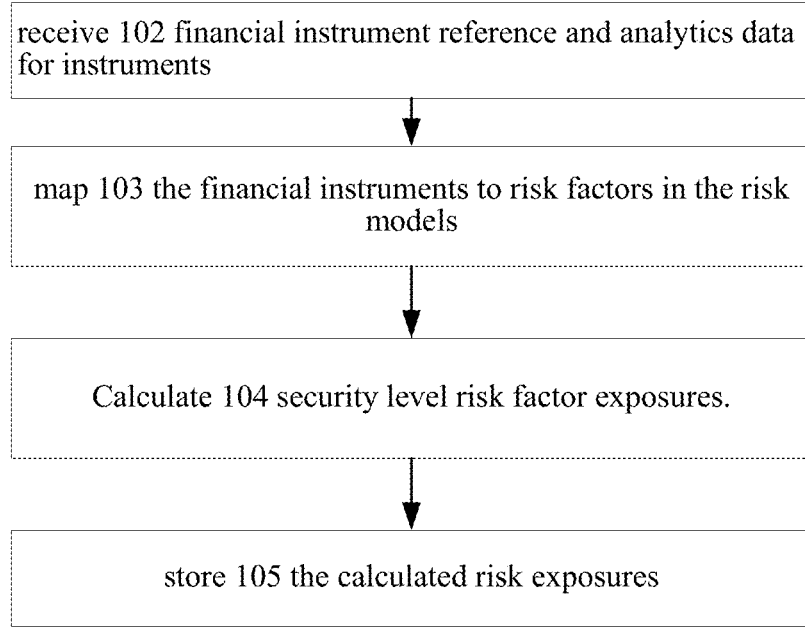
FIG. 5B-1
FIG. 5B-2
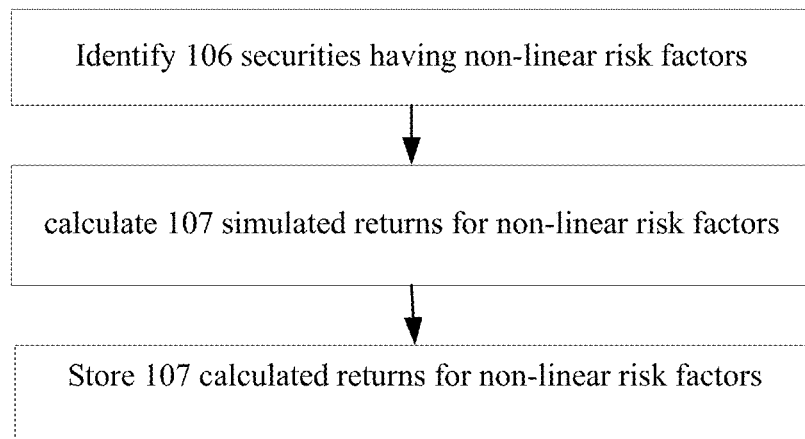

| RISK FACTOR | CTR TO FACTOR DURATIONS (BETA-WEIGHTED) ||| FACTOR VOLS IN BPS (TRIM) |||| CONTRIBUTION TO TE BY FACTOR |||
|---|---|---|---|---|---|---|---|---|---|---|
| | FUND | INDEX | DIFF | LEV | TS 2Y | DFT 2Y | 4K 40 | 8K 12 | TOTAL | ISOL | CORR |
| TSY NOMINAL 1Y | 0.13 | 0.15 | (0.03) | 0.61 | 10 | 10 | 12 | 14 | (0) | 0 | (0) |
| TSY NOMINAL 2Y | 0.35 | 0.40 | (0.05) | 0.66 | 17 | 18 | 20 | 25 | (0) | 0 | (0) |
| TSY NOMINAL 3Y | 0.40 | 0.53 | (0.12) | 0.76 | 24 | 25 | 25 | 32 | (1) | 1 | (2) |
| TSY NOMINAL 5Y | 0.80 | 0.82 | (0.02) | 0.98 | 38 | 40 | 40 | 50 | (0) | 0 | (0) |
| TSY NOMINAL 7Y | 0.85 | 0.89 | (0.04) | 0.96 | 44 | 46 | 47 | 54 | (1) | 0 | (1) |
| TSY NOMINAL 10Y | 0.90 | 0.69 | 0.21 | 1.31 | 43 | 45 | 46 | 51 | 7 | 10 | (4) |
| TSY NOMINAL 20Y | 0.39 | 0.41 | (0.02) | 0.95 | 45 | 46 | 49 | 54 | (1) | 0 | (1) |
| TSY NOMINAL 30Y | 0.95 | 0.89 | 0.06 | 1.07 | 46 | 47 | 50 | 57 | 2 | 1 | 1 |
| 5 CONVEXITY | 24 | 21 | 3 | 1.15 | | | | | | | |
| REAL - NOMINAL 2Y | 0.00 | 0.00 | 0.00 | - | 72 | 74 | 80 | 74 | (0) | 0 | (0) |
| REAL - NOMINAL 5Y | 0.00 | 0.00 | 0.00 | - | 45 | 46 | 53 | 48 | (0) | 0 | (0) |
| REAL - NOMINAL 10Y | (0.00) | 0.00 | (0.00) | - | 32 | 33 | 41 | 35 | 0 | 0 | 0 |
| REAL - NOMINAL 20Y | 0.00 | 0.00 | 0.00 | - | 31 | 33 | 45 | 36 | 0 | 0 | 0 |
| SWAP SPREAD 2Y | 0.13 | 0.48 | (0.35) | 0.27 | 8 | 8 | 11 | 7 | (0) | 1 | (1) |
| SWAP SPREAD 5Y - 2Y | 0.03 | 0.11 | (0.08) | 0.28 | 10 | 10 | 12 | 12 | (0) | 0 | (0) |
| SWAP SPREAD 10Y - 5Y | 0.03 | 0.11 | (0.08) | 0.29 | 9 | 10 | 13 | 11 | (0) | 0 | (0) |
| GOV REL LOAS | 0.15 | 0.56 | (0.41) | 0.27 | 13 | 14 | 20 | 15 | 4 | 4 | 0 |
| ABS NON-HE LOAS | 0.00 | 0.00 | 0.00 | - | 32 | 33 | 52 | 27 | 0 | 0 | 0 |
| ABS HE LOAS | 0.00 | 0.00 | 0.00 | - | 148 | 193 | 437 | 122 | 0 | 0 | 0 |
| CMBS (FIXED) LOSS | | | | | 716 | 753 | 1167 | 596 | | | |
| CREDIT SHORT LOAS | 0.00 | 0.00 | 0.00 | - | 47 | 49 | 66 | 25 | 0 | 0 | 0 |
| CREDIT INT LOAS | 0.00 | 0.00 | 0.00 | - | 51 | 55 | 73 | 38 | 0 | 0 | 0 |
| CREDIT LONG LOAS | 0.00 | 0.00 | 0.00 | - | 45 | 48 | 60 | 35 | 0 | 0 | 0 |
| CDS/CASH BASIS | 0.00 | 0.00 | 0.00 | - | 74 | 76 | 86 | 88 | 0 | 0 | 0 |
| MUNI LOAS | 0.00 | 0.00 | 0.00 | - | 44 | 45 | 50 | 49 | 0 | 0 | 0 |
| MBS LOAS (IMPLD VOL) | 0.00 | 0.01 | (0.01) | - | 65 | 65 | 80 | 69 | 0 | 0 | 0 |
| SWAPTION VOL (3 X 7) | (0.00) | 0.01 | (0.01) | (0.03) | 13 | 14 | 15 | 13 | 0 | 0 | 0 |

MULTI-FACTOR RISK MODELING PLATFORM

BACKGROUND

This invention relates generally to computer implemented modeling techniques.

Computer implemented modeling involves execution and/or development of mathematical models of complex systems or processes. One type of modeling involves risk evaluation. One particular type risk evaluation involves calculating the expected market risk of a portfolio of one or more financial assets such as financial instruments or financial positions, insurance positions, etc. to various scenarios.

Multi-factor risk modeling is a type of model used to model the risk of a portfolio which has securities with exposure to various risk factors. In such a multi-factor risk model, a modeling algorithm estimates tracking error volatility (TEV) and other risks measures based on a set of two or more risk factors. The set of risk factors are implemented in software by hard coding into a software program using a programming language. The computer implemented modeling algorithm is typically executed using one or more server computer systems that access data from a database.

SUMMARY

According to an aspect, a system includes a storage medium storing a multi-factored risk model that calculates values of investment portfolios in response to a market event, a plurality of processor engines configured to execute the multi-factor risk model, the plurality of processor engines further configured to, retrieve from a storage medium data for use with the multifactor risk model, the data including historical and intraday reference data for financial instruments, portfolios, financial indexes, intraday information on new holdings, sector and classification data, analytic data, a first portion of the processor engines configured to calculate risk exposures of portfolios based on the multi-factor risk model, the risk exposures stored in storage structures by the first portion of engines, and a second portion of the processor engines configured to query the storage structures that store the calculated returns.

The following are embodiments with this aspect. The second portion of engines execute queries to return results for different types of aggregation scenarios. The second portion of engines execute queries to return results from the storage structures for different types of aggregation scenarios. The first portion of engines calculate linear exposure factors and stores results from linear exposure calculations into a corresponding table structure in memory. The first portion of engines calculate non-linear exposure factors and store results from the non-linear exposure calculation into a corresponding table structure in memory. The system includes a web service running on the host to provide user interface services to connect to the database server. The system includes a report generator to generate reports based on the results stored by the second portion of engines. The system includes an engine to execute a process to periodically load the data storage medium with reference data for the multi-factor risk models copied from source databases. The multi-factor risk models are selected from the group consisting of a historical parametric model, a historical simulation model and a Monte Carlo model. The system includes a host system that compiles SQL queries into executable code segments to produce query plans to query the storage medium to retrieve calculated values from execution of the multi-factored risk model, and manages distribution of queries to the second portion of processor engines for execution of the queries.

According to an additional aspect, a system includes a high performance relational database server that includes a storage medium storing metadata logic for multi-factored risk models, enterprise security reference, analytics, portfolio holdings, risk model parameters and model calculation results, a plurality of processor engines configured to, retrieve from a data storage medium data to input to the multi-factor risk models, a first portion of the processor engines configured to execute the metadata logic for multi-factored risk models for securities of interest, a second, different portion of the processor engines configured to calculate a defined set of risk measures for a defined set of investment portfolios and benchmarks.

The following are embodiments with this aspect. The linear risk factors' returns are aggregated for all the positions within portfolios and benchmarks. The non-linear risk factors' returns are aggregated for all the positions with exposures to non-linear risk factors in portfolios and benchmarks. The non-linear factors simulated returns are calculated and stored into a corresponding table structure. The system further includes a web service layer to provide user interfaces to connect to the database server and call the second portion of risk processing engines to conduct risk calculations. The system further includes a report generator to generate reports based on the results stored by the second portion of engines. The system further includes a data storage medium that stores the data to input to the multi-factor risk models; and an engine to execute a process to periodically load the data storage medium with reference data for the multi-factor risk models from source databases. The multi-factor risk models are selected from the group consisting of a historical parametric model, a historical simulation model and a Monte Carlo model.

According to an additional aspect, a system includes a storage medium storing a multi-factored risk model that calculates values of investment portfolios in response to a market event, a storage medium that stores data for use with the multifactor risk model, the data including historical and intraday reference data for financial instruments, portfolios, financial indexes, intraday information on new holdings, sector and classification data, analytic data; a plurality of processor engines configured to execute the multi-factor risk model; a first portion of the processor engines configured to calculate return based on the multi-factor risk model, the risk exposure stored in storage structures by the first portion of engines; a second portion of the processor engines configured to query the storage structures that store the calculated returns; and a host system that compiles SQL queries into executable code segments to produce query plans to query the storage medium to retrieve calculated values from execution of the multi-factored risk model, and manages distribution of queries to the second portion of processor engines for execution of the queries.

The following are embodiments with this aspect. The host system configures the system to query storage structures when the second portion of the processing units is unable to support parallel processing for a particular task. The second portion of engines execute queries to return results from the storage structures for different types of aggregation scenarios. The first portion of engines calculate linear exposure factors and stores results from linear exposure calculations into a corresponding table structure in memory. The first portion of engines calculate non-linear exposure factors and store results from the non-linear exposure calculation into a corresponding table structure in memory. The system further includes a web service running on the host to provide user interface services to connect to the database server. The system further includes a report generator to generate reports based on the results stored by the second portion of engines. The system further includes an engine to execute a process to periodically load the data storage medium with reference data for the multi-factor risk models copied from source databases. The multi-factor risk models are selected from the group consisting of a historical parametric model, a historical simulation model and a Monte Carlo model.

According to an additional aspect, a method includes storing a multi-factored risk model that calculates values of investment portfolios in response to a market event, retrieving from a storage medium data for use with the multifactor risk model, the data including historical and intraday reference data for financial instruments, portfolios, financial indexes, intraday information on new holdings, sector and classification data, analytic data, calculating by a first portion of a plurality of processor engines risk exposures of portfolios based on the multi-factor risk model, the risk exposures stored in storage structures by the first portion of engines, and querying by a second, different portion of the processor engines the storage structures that store the calculated returns.

The following are embodiments with this aspect. The method further includes aggregating results returned by the second portion of engines executing queries according to a defined aggregation scenario. The second portion of processor engines execute queries to return results from the storage structures for different types of aggregation scenarios. The method further includes calculating by the first portion of processor engines linear exposure factors and storing results from linear exposure calculations into a corresponding table structure in memory. The method further includes calculating by the first portion of processor engines non-linear exposure factors and store results from the non-linear exposure calculation into a corresponding table structure in memory. The method further includes periodically loading the data storage medium with reference data for the multi-factor risk models copied from source databases. The multi-factor risk models are selected from the group consisting of a historical parametric model, a historical simulation model and a Monte Carlo model. The method further includes compiling by a host system that queries into executable code segments to produce query plans to query the storage medium to retrieve calculated values from execution of the multi-factored risk model; and managing distribution of queries to the second portion of processor engines for execution of the queries. The host system complies the query plan when the second portion of the processing units is unable to support parallel processing for a particular task.

The above techniques can include additional features and one or more of the following advantages.

The system configures processing units in a manner that integrate database, sever processing, and storage in a compact system that is optimized for analytical processing while permitting flexible growth in system complexity. The system in embodiments is a high performance relational database provides processing close to a data source. The system provides a balanced, massively parallel platform for execution of advanced analytics such as multifactor risk models for plural scenarios, portfolios. The system delivers risk measures to external applications, tools and reporting tools. The system supports intra-day portfolio changes and on-demand risk calculations. The system enables flexible risk reporting and analysis, robust support for on-going risk model enhancements, scalability and globalization, transparency and traceability, and risk-based performance attribution.

The details of one or more embodiments of the invention are set forth in the accompanying drawings and the description below. Other features, objects, and advantages of the invention is apparent from the description and drawings, and from the claims.

DESCRIPTION OF DRAWINGS

FIGS. 5B-1 to 5B-4 are flow charts depicting specific types of metadata based calculations.

FIGS. 7A-7B are charts depicting an exemplary factor aggregation level report.

The figures are to be read with the accompanying description.

DETAILED DESCRIPTION

Figure 1:
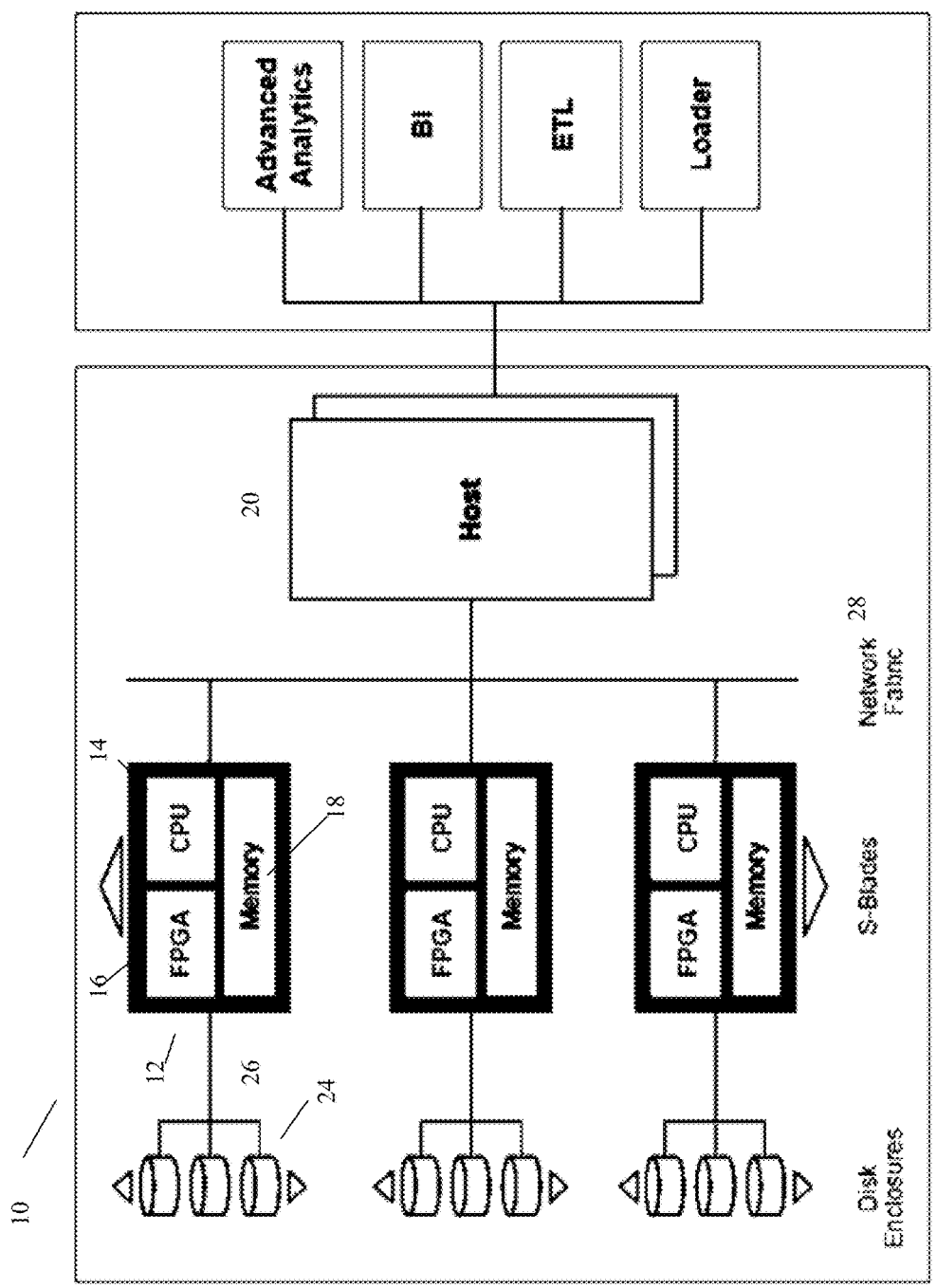
FIG. 1 is a block diagram of a modeling platform.

Referring now to FIG. 1, a hardware architecture for a risk model platform system 10 is shown. In an embodiment, the metadata risk platform system 10 is implemented using a massively parallel processing high performance database system. Various types of massively parallel processing high performance database systems can be used. In an additional embodiment, the risk platform system 10 is implemented using a metadata description of risk factors. By a metadata description is meant the storage of rules and logic operations that are executed for risk models and a risk calculation engine. The rules and logic operations are editable and can be quickly developed for new factors. A metadata description or module involves mapping of securities and risk factors and calculating of factor exposures, as will be further discussed below.

In general, the system depicted in FIG. 1 includes a plurality of processing units 12. Each processing unit 12 is an independent server computer including a processing engine having multi-core CPUs 14, e.g., 4 to 8 cores or more, with field programmable gate arrays 16 (FPGA) and memory 18 to enable high performance analytic execution. In this implementation, the FPGAs combine data, and CPU execution together act as a single processing unit (SPU). Other approaches can be used. Memory 18 is several gigabytes of random access memory (RAM). The CPU cores have execution rates suitable to run complex multifactor risk algorithms using large data volumes for typical analytics applications. The system 10 provides a high performance relational database server that runs on the processing units 12 leveraging the performance of those processing units 12.

The system 10 also includes host computers 20. The host computers 20 are SMP (symmetric multi-processor) Linux® based systems configured to run as the database server, e.g., query storage structures when the processing units 12 are unable to support parallel processing for a particular task. The hosts 20 are configured in an active-passive configuration for high availability. An active one of the hosts presents a standardized interface to external tools and applications. The active host compiles structured queries such as ANSI SQL (American National Standards Institute structured query language statements) queries into executable code segments, produces optimized query plans, and distributes the code segments to the processing units 12 for execution.

The system 10 also includes storage devices 24, e.g., disks. The disks are high-density high-performance RAID protected disks. Each disk contains a slice of every database table's data. The system 10 also includes a high-speed network 26 that connects disk hosts to the processing units 12, allowing all of the disks to simultaneously stream data to the processing units 12 at the maximum rate possible. The system 10 also includes a network fabric 28 that interconnects processing units 12 and other system 10 components.

The system 10 runs a customized IP-based protocol that fully uses the total cross-sectional bandwidth of the fabric and eliminates congestion even under sustained, bursty network traffic. The network 28 is scalable to, e.g., distribute the workload of complex calculations on large data sets, while allowing each node 12 to initiate large data transfers to every other processing unit 12. The processing units 12 integrate database, sever processing, and storage in a compact system that is optimized for analytical processing while permitting flexible growth in system complexity. The system 10 provides processing close to the data source, in a balanced, massively parallel architecture platform for advanced analytics.

The system 10 supports dynamic risk model development and calculation. The system 10 delivers risk measures to external applications, tools (Excel spreadsheets and the like) and other reporting tools through its service layer interface, discussed below. The system 10 also supports intra-day portfolio changes and on-demand risk calculations. The risk model executed can be of various multi-factored risk model types, e.g., covariance based closed form risk calculations, and simulation-based risk calculations.

The system 10 enables flexible risk reporting and analysis, robust support for on-going risk model enhancements, scalability and globalization, transparency and traceability, and risk-based performance attribution. These capabilities include user applications, e.g., a Risk user interface and a Risk modeler and a service-layer interface, discussed below.

Figure 2:
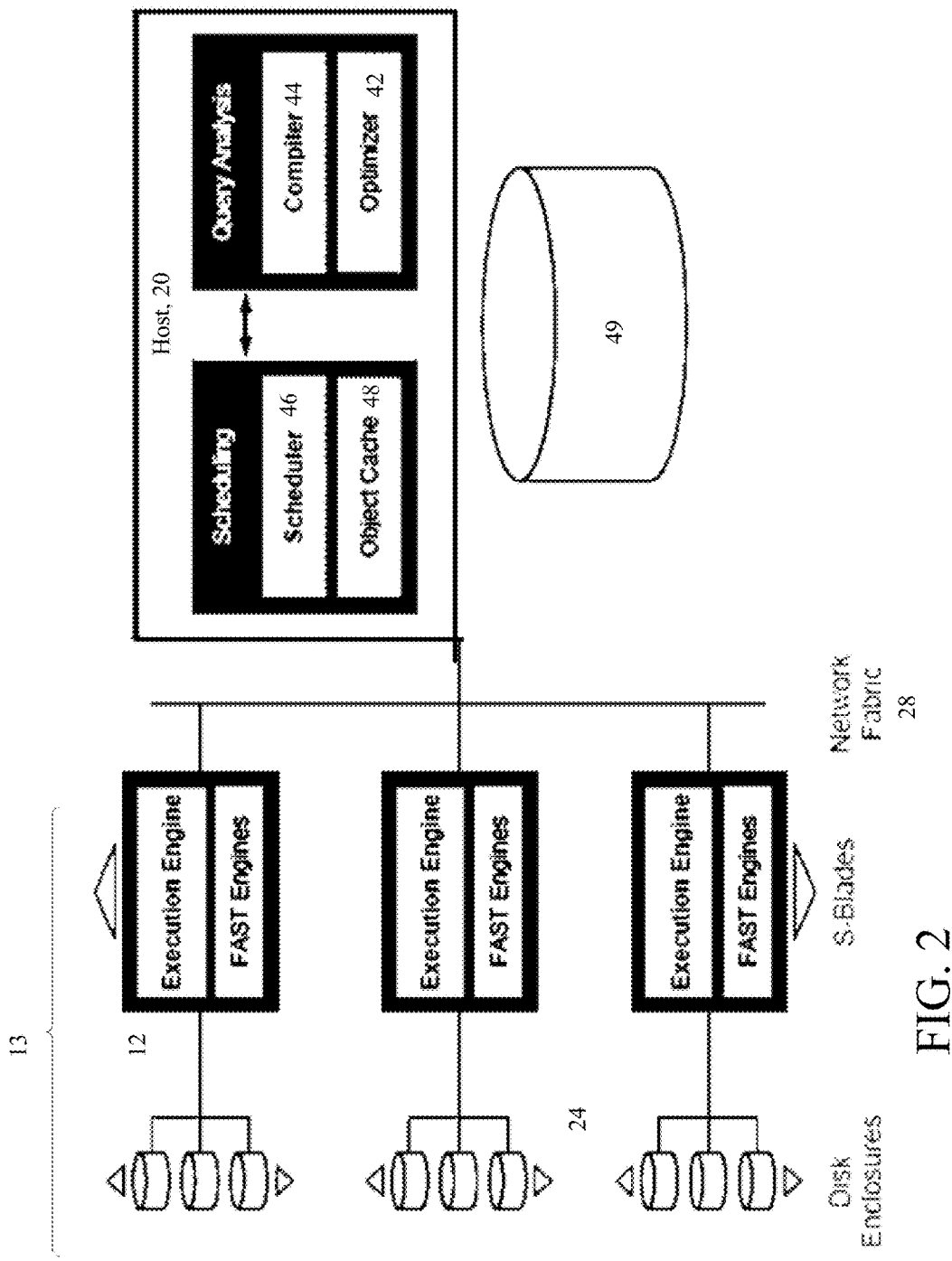
FIG. 2 is a block diagram of a software view of the modeling platform of FIG. 1.

Referring now to FIG. 2, a software architecture 40 for the system 10 is shown. In FIG. 2, the execution engine/FAST engines correspond to the processing units 12 (of FIG. 1) viewed from a software perspective. In one implementation the processing units 12 are configured along with disk 24 as a database server, in one embodiment executing as a relational database 13.

However, in some situations the database server software runs on hosts 20 having components that include a parallel query optimizer 42 that along with a SQL complier 44 transforms queries to execute efficiently and ensuring that each component in each processing node is fully utilized. The Host performs query scheduling with a scheduler 46 that along with an object cache 48 keeps the system 10 executing queries at peak throughput.

Processors 12 efficiently execute multiple queries and complex analytics functions concurrently. Network fabric 28 enables movement of large amounts of data through the high performance database server system 10.

The high performance database server 10 has a storage medium 49 storing a multi-factored risk model to calculate risk exposure of an investment portfolio based on exposure to various scenarios. The processing engines 12 are configured to execute the multi-factor risk model, with a first portion of the engines 12 configured to calculate risk exposure based on the multi-factor risk model stored in storage structures, and a second portion of the engines 12 are configured to query the storage structures that store calculated exposures as input to a particular multi-factor risk model to calculate risk exposure of a portfolio.

Figure 3A:
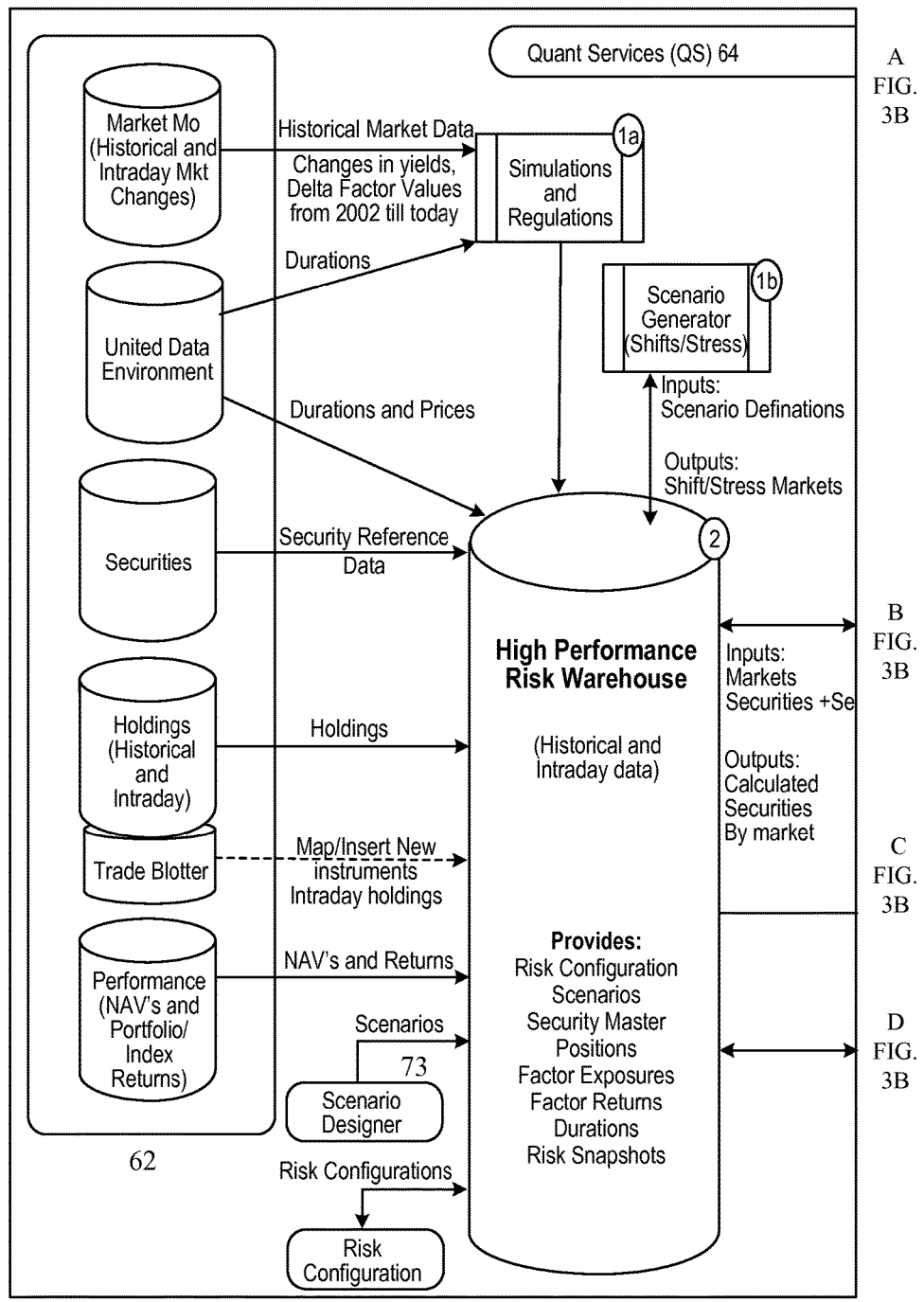
FIGS. 3A-3C are block diagrams of a logical view of the modeling platform of FIG. 1.
Figure 3B:
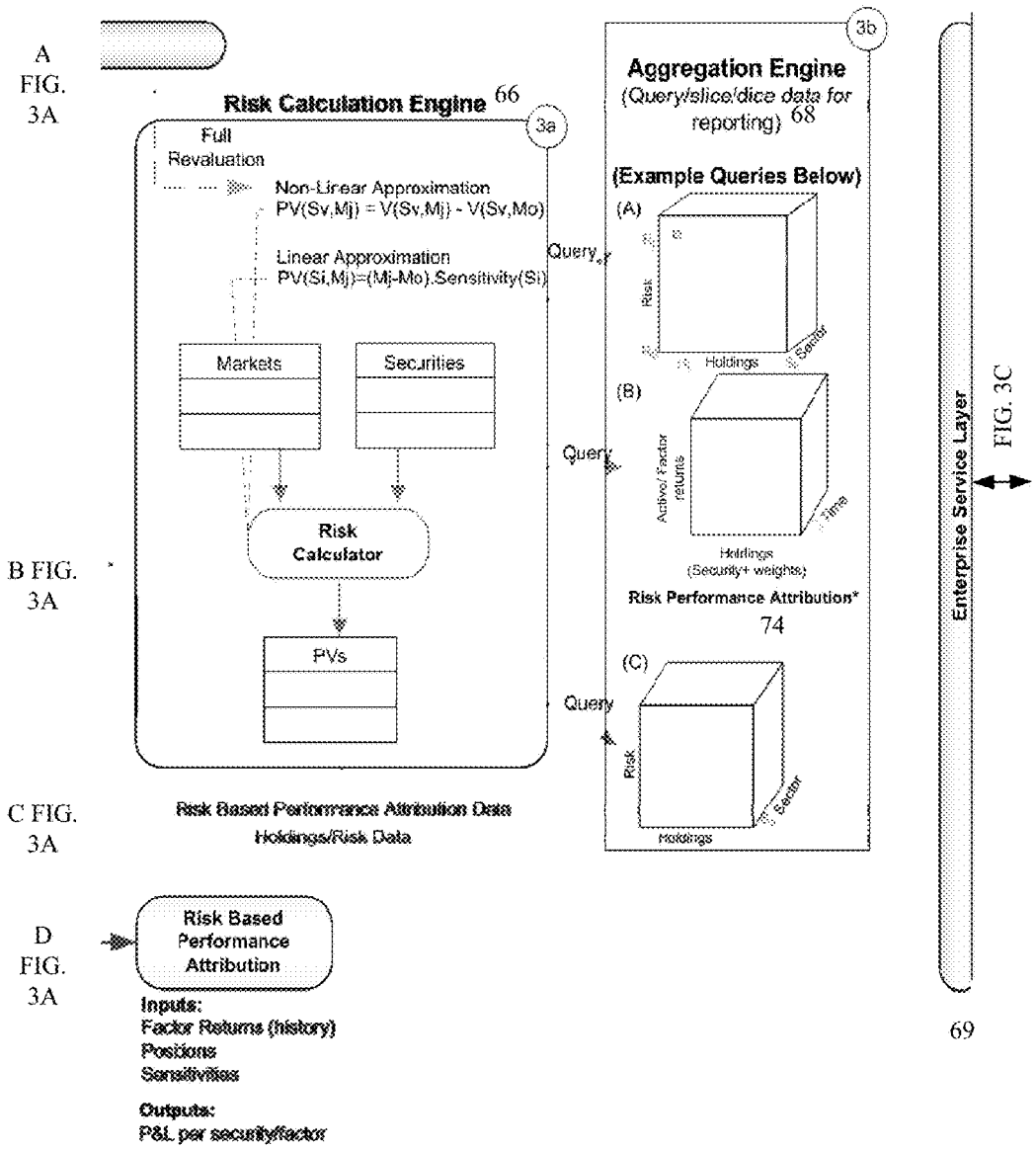

Referring now to FIGS. 3A and 3B, a logical architecture 60 for the metadata risk platform system 10 is shown. In this view of the system 10, the system 10 is shown having storage 62 for reference data. For example, such reference data when used to model a risk platform for securities includes data for financial instruments and fund/indexes, holding, etc., as illustrated. In addition, the source data includes intraday information on new funds and holdings. The reference data also includes sector and other classifications, analytics and fund and index holdings information (e.g., weights) and other metrics or attributes, i.e., extensible tables and fund of fund classifications, etc.

Quant Services 64 provides the system 10 with analytical tools or (analytics) on the financial instruments. The risk calculation engine 66 is used as part of a batch process or part of on the fly process to generate risk measures and factor returns for linear and non-linear factors of a multi-factor risk model. This engine 66 can also be called for full revaluation in which case the engine will call the Quant services 64 to perform a full revaluation. The Risk Aggregation Engine 68 interfaces to the service layer 69 that calls risk aggregation API's (FIG. 3C) to return results for different types of aggregation scenarios. The Risk Aggregation Engine 68 runs on e.g., the second portion of processing units 12 mentioned above and aggregates return distributions for a portfolio.

Scenario generator 72 refers to sensitivity analysis functionality where users can define scenarios using a scenario designer 73 and executes a process of generating security level returns using the scenario generator module 72. The scenario generator can also be called on demand for updating forward looking market scenarios and computing forward looking scenario based risk measures. The risk aggregation engine 68 multiply the current factor exposures by the simulated future market scenarios of risk factor return to estimate the forward looking return distributions for a fund against its benchmark. Similarly, the performance attribution engine 74 can replace simulated factor returns with realized factor returns for a given period and replace the current factor exposures with beginning of the period factor exposures to decompose the fund's realized returns into the different risk factors. The risk model platform enables portfolio managers to look at the active risk taken at the beginning of an investment period and how much active returns were generated from those active risks at the end of the investment period.

Figure 3C:
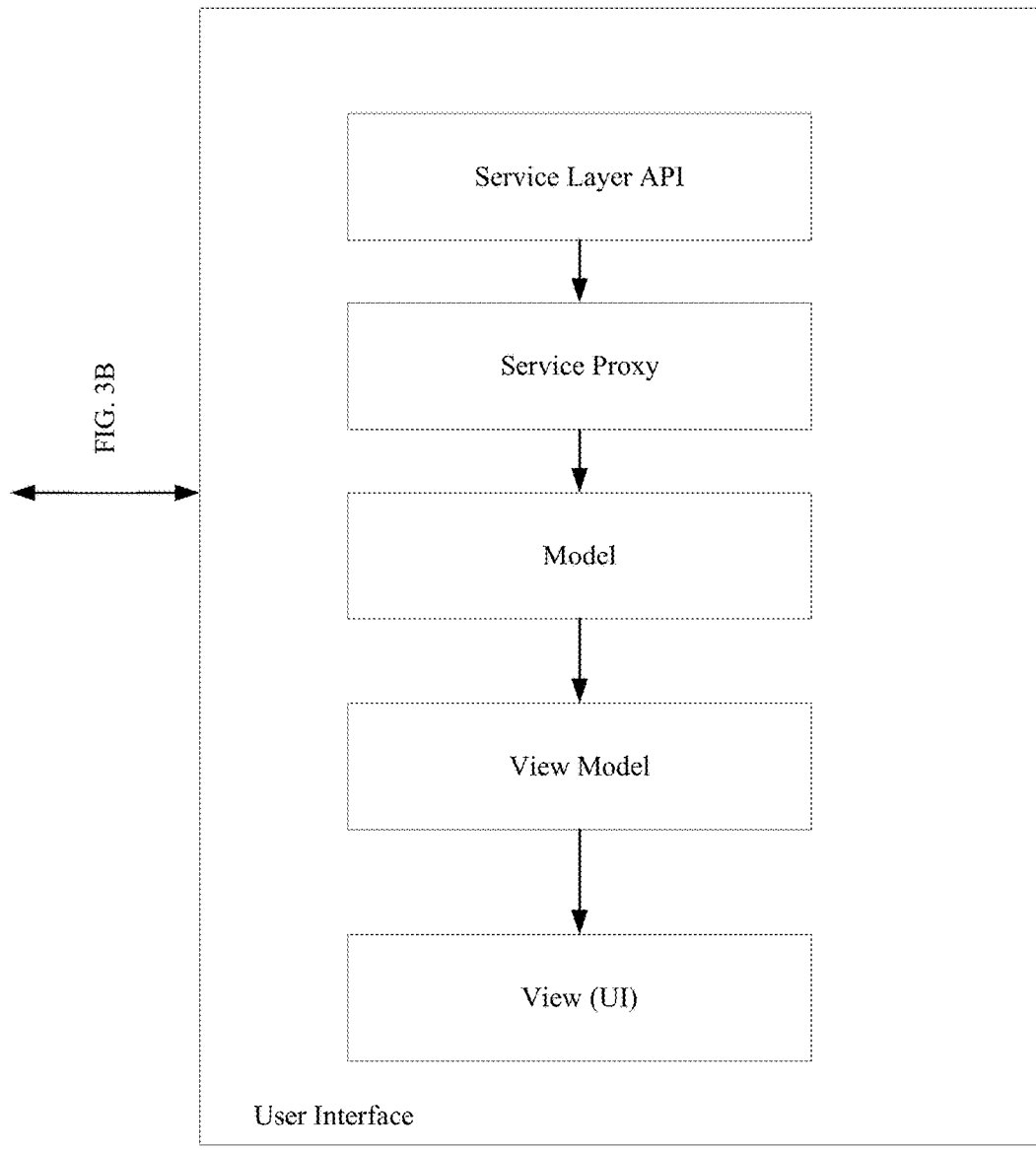

Referring now to FIG. 3C, exemplary user interface processes are shown. The user interfaces support real-time drill-down and drill-through risk analysis across multiple portfolios, security hierarchies and dimensions detailed risk reporting on individual portfolios and what-if capabilities. The user interface allows users to visualize the risk data in the database system 10. Data visualization is provided through data grids and charts that users can produce and customize. The user interface part of the application uses for example, WPF (Windows Presentation Framework, Microsoft Inc.) technology or others to provide a high-performance, stylish and user friendly application. The user interface architecture is based on a (Model, View-Model View)

arrangement (depicted in FIG. 3C) that provides separation of the business model from the user interface.

Non-UI services include authentication of users (through a login screen), Application Configuration to configure non-user-defined settings for the application such as defaults and behaviors, preferences management allows the application to store and retrieve user-defined settings. Exception Management provides a uniform way of handling application exception by logging them for future references and reviews.

Caching can store non-volatile data locally in order to increase application performance. Event management provides a channel to distribute application wide events and notifications. The Risk Aggregation API uses the three tables here referred to as "FIR_FACTOR_EXPOSURE", "FIR_SIM_CUBE", and "FIR_SIM_FACTOR_RETURN" in calculating the FUND level Tracking Error Volatility (TEV) and determine the contribution to TEV by security, sector or factor and stores aggregated results into a "risk datamart" or return the aggregated data real time back to the services layer 69.

Risk web services provides a user interface (UI) to connect to the system 10 and query for aggregated and drilldown data based on input criteria. The risk web services are also called in the "what-if" scenarios to run the aggregation logic based on changes that a user makes to the portfolio. Risk datamart is a typical program that produces reports for specific aggregated and drilldown result metrics, as calculated by the risk engine 66. These metrics are generated as part of a daily batch cycle and stored for reporting. Intraday, the datamart may be updated selectively based on the changes to the underlying positions for a fund.

Simulations data include risk factor value simulation sets that are provided for different time horizons.

Metadata

The described metadata approach to risk modeling embeds risk model logic as data in the relational database system 13. The metadata approach allows users to dynamically configure different types of logic related to risk models that drive generation of underlying risk model data. The metadata model is driven by a particular risk model and particular simulations. A combination of particular risk model and particular simulations with reference data using metadata logic generates output data for risk model reports.

Figure 4:
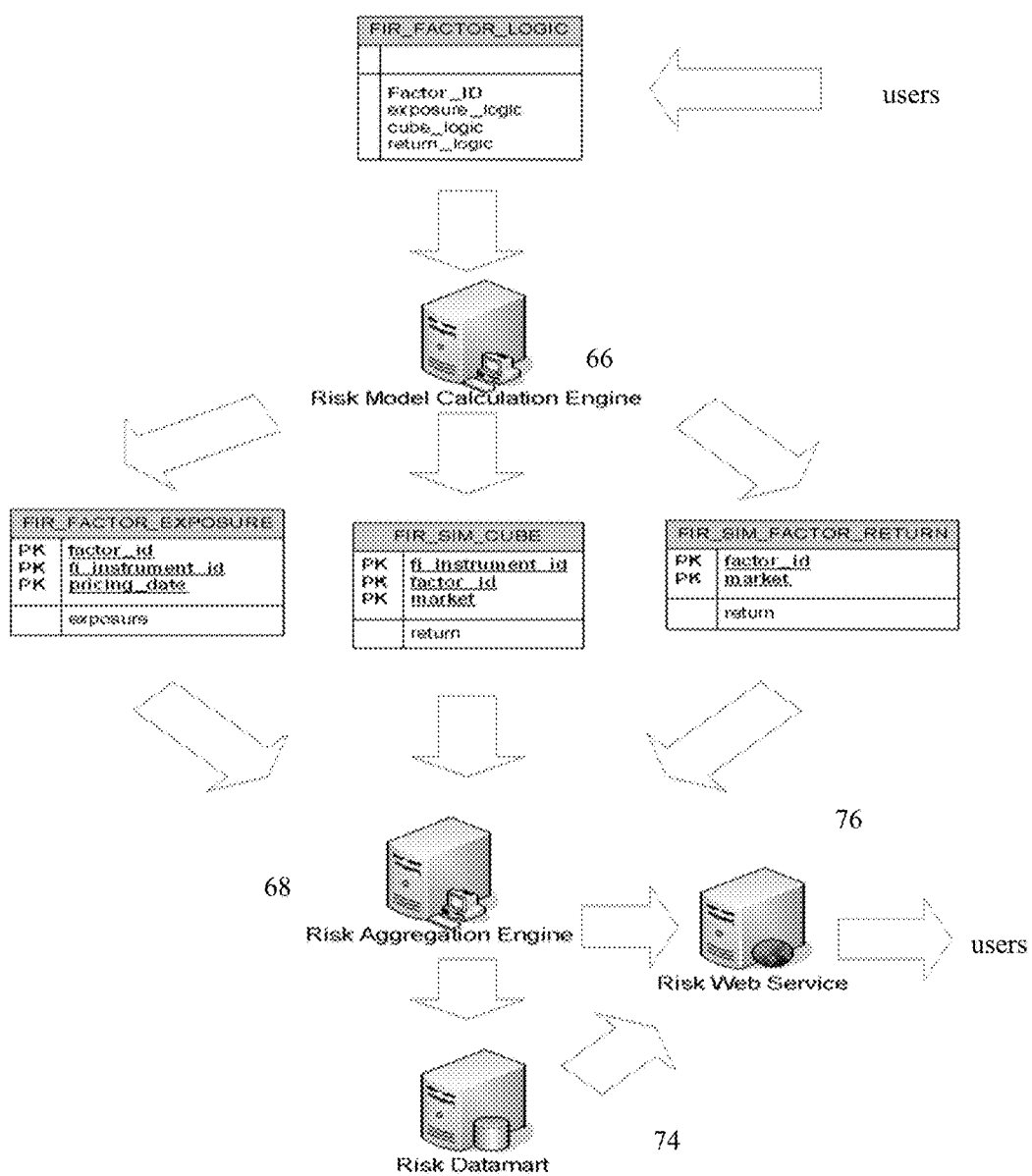
FIG. 4 is a block diagram depicting data flow.

Rules in this data model are defined using the SQL Metadata Language (or other suitable metadata query language) providing a mechanism that is relatively easily understood. The logic is stored in table FIR_META_LOGIC in the storage 49 in the host 20 with a unique ID assigned. Metadata logic is related to specific functionality. Examples of metadata logic types are provided below:

Linear Instruments Exposure calculation
Non-Linear Instruments Exposure Calculation
Non-Linear Instrument Return Calculation
Sector Beta calculations and other calculated Instrument level analytics logic
Logic to define the instrument level classification of hierarchy for sectors and sub-sectors
Metadata Risk Calculations Referring now to FIG. 4, data flow 70 for risk calculations using metadata modules defined for various types of risk factors. The system 10 uses these metadata modules to define the risk factor mapping and exposure logic. The risk model calculation engine 66 populates one of, e.g., three different types of table structures in computer storage, e.g., FIR_FACTOR_EXPOSURE; FIR_SIM_CUBE_NL; and FIR_SIM_FACTOR_RETURN, with results of calculation of each of these metadata risk modules for all securities, instruments, etc. under consideration by the system 10 for various scenarios. Other table structures in computer storage are possible.

The risk aggregation engine 68 aggregates results from execution of the various metadata modules according to a particular multi-factor risk model. The results of this aggregation are delivered to the risk web services 74 and/or the risk datamart 76. The risk datamart 76 also delivers its results to the risk web services 74.

The metadata factor logic enables full valuations for simulated market scenarios, while providing separation between risk model implementation and risk aggregation and calculation. In FIG. 4, the flow of some of the factor definitions used in the risk calculation process are show. In an actual implementation, other data elements are needed in the risk calculations, as described in the examples later and the table below.

With the metadata approach, multi-factor risk models are implemented as a set of metadata logical statements or modules that are stored in the high performance database system 10, e.g., storage 49 in one or more hosts. These various metadata modules selected and are assembled together according to a particular multi-factored risk model. The set of metadata logical statements are used in the risk calculation engine to calculate a set of risk measures for investment portfolios. Various ones of the stored set of metadata logic executed and results subsequently retrieved to describe the particular multi-factor risk model. Each of the metadata risk factor modules includes factor mapping, factor exposure calculation logic, and factor return calculation logic. As mentioned metadata are used to store the logic required by the risk calculation engine 66.

Three different types of logic are specified as metadata in the FIR_FACTOR_LOGIC table (Table 1). In one implementation, the metadata language is pseudo SQL statements. The risk model calculation engine executes the meta language "select" statement and performs an "insert" from select process to populate the target risk data tables which can be used for risk aggregation engine. FIR_FACTOR_LOGIC table (Table 1) below details the logic type, the target table and a description of the statement.

TABLE 1

| Logic Type | Target Table | Description |
| --- | --- | --- |
| Exposure Logic | FIR_FACTOR_EXPOSURE | Map securities to risk factors and calculate the risk factor exposures for the respective securities |
| Cube Logic | FIR_SIM_CUBE_NL | Calculate the non-linear factor returns for securities which have return sensitivities to those factors. Currently only CMBS (commercial mortgage backed security) Loss factor is required. |
| Return Logic | FIR_SIM_FACTOR_RETURN | Calculate the factor returns for non-linear factors whose returns are a simple function of other linear factor(s). Currently Convexity is the only factor requiring such calculation. |
| Spread Beta | FIR_RISK_ANALYTICS | Calculate spread beta for all |
| Security Srisk | FIR_RISK_ANALYTICS | Calcualate specific risk for all securities |
| Sector Aggregation | FIR_SEC_SECTOR | Map all securities to their respective sectors |

In operation the system 10 receives an investment portfolio comprised of a plurality of securities. The risk calculation engine 66 in the system 10 maps one or more of the metadata risk factor modules to the securities in the portfolio, and calculates an exposure risk for the securities using the calculation logic in the mapped metadata risk factor modules. The system 10 returns the calculated risk exposure for the securities for the mapped data risk factor modules.

Metadata Logic

The FIR_META_LOGIC table defines the dynamic and externalized logic to calculate the exposures or returns for different linear or non-linear risk factors. The logic is stored in SQL format. Other structured query languages could be used.

Exposure Logic

The Exposure logic for all the linear factors is used by the risk calculation engine 66 to calculate risk exposure of the portfolio, and to store the results into a normalized FIR_FACTOR_EXPOSURE exposure table. In case of linear factors the calculations are usually the duration or the sensitivity of the security to the corresponding factor. In special cases the duration may be multiplied by a spread or beta sector.

Cube Logic

The Cube logic is used by the risk calculation engine 66 for non-linear factors to calculate the security factor return for the respective non-linear factor (e.g. CMBS) and to store the results into the cube table FIR_SIM_CUBE_NL. The factor return for the respective security factors in the exposure and the corresponding simulation factor movements.

Return Logic

The Return logic for special factors (could be linear or non-linear) is used by the risk calculation engine 66 to calculate the effective factor return or movement and to store the return into the simulations factor return table. This effective factor return is used in aggregation to multiply with the corresponding exposure to calculate the security return for Tracking Error Volatility (TEV) and contribution to TEV calculations.

Exposure Data

The FIR_FACTOR_EXPOSURE table stores linear factor exposures that are used for calculations of security returns and TEV. The logic for calculating the factor returns is determined by the approach mentioned in the Exposure Logic section above. The FIR_FACTOR_EXPOSURE_NL table stores the non-linear factor exposures that may be dependent on some complex calculations based on simulations or other durations as loss durations.

Non-Linear Cube

The FIR_SIM_CUBE_NL table represents the factor return calculated for more complex factors like CMBS where there is dependency on other factors and involves special logic for bucketing loss durations. The calculation logic is meta-data for the ease of update e.g. the thresholds of the buckets. The value stored in this table is the factor return at the security level and factors in the exposure calculations as well. While aggregating the system 10 can use this return as it is to get the security level return. This table can also hold the security level return for full revaluation scenarios represented by factor_id=0.

Simulation Data

FIR_SIM_FACTOR_RETURN captures the simulation data and corresponding factor return/movements in normalized form. Simulations are run in "R" to provide simulation output data. The factor level simulation data is loaded in FIR_SIM_FACTOR_RETURN table. For OAC (option adjusted convexity) the factor simulations are calculated using other yield curve risk factors. The calculation logic is defined in FIR_META_LOGIC table. As part of the aggregation of OAC factor return is simply a multiplication of the factor exposure and the computed OAC factor returns.

Figure 5A:
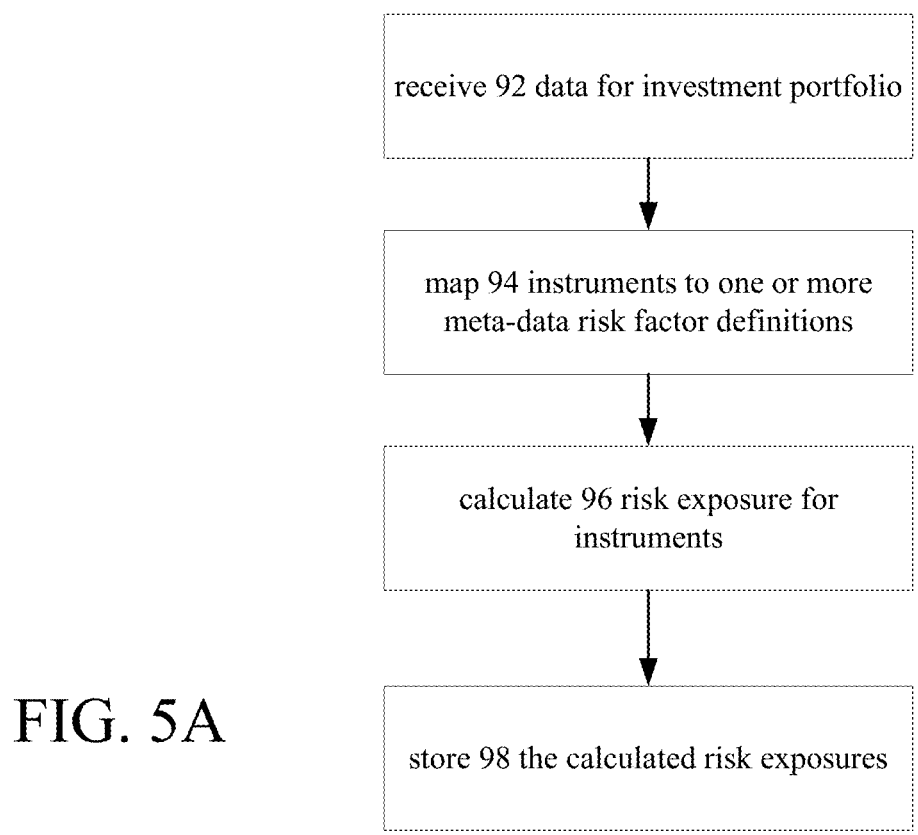
FIG. 5A is flow chart depicting a metadata-based risk exposure calculation.

Referring now to FIG. 5A, a process' 90 executed on the system 10 for execution of one or more multi-factor risk models to calculate a set of risk measures for an investment portfolio is shown. As mentioned, multi-factor risk models are defined by sets of metadata risk factor modules that describe the models. The metadata risk factor modules include factor mapping, factor exposure calculation logic, and factor return calculation logic. The process 90 receives 92 data that pertains to an investment portfolio comprised of a plurality of financial instruments. The system 10 maps 94 one or more of the metadata risk factor modules to each of the plurality of financial instruments in the portfolio and calculates 96 a risk exposure for each of the plurality of financial instruments using calculation logic in the mapped metadata risk factor modules, and stores 98 the calculated risk exposures for the financial instruments based on execution of the mapped data risk factor modules.

Such computer implemented techniques involve storing the logic that describes the one or more multi-factored risk models in a high performance relational database, as described above. These models are provided to estimate and calculate ex-ante returns, (e.g., the expected return of an investment portfolio) volatility of the plurality of financial instruments in such an investment portfolio. The logic for multi-factor risk models are stored as metadata modules that include risk factor mapping to securities, risk factor exposure calculation logic, and factor return calculation logic, as mentioned above. Risk factor exposure calculation logic is provided for linear and non-linear risk factors. In addition, metadata modules can include sector mapping, sector spread beta calculation logic, security level specific risk calculation logic, and sector level specific risk calculation logic.

Factor Mapping and Factor Exposure Calculation

Figures 3, 5B:
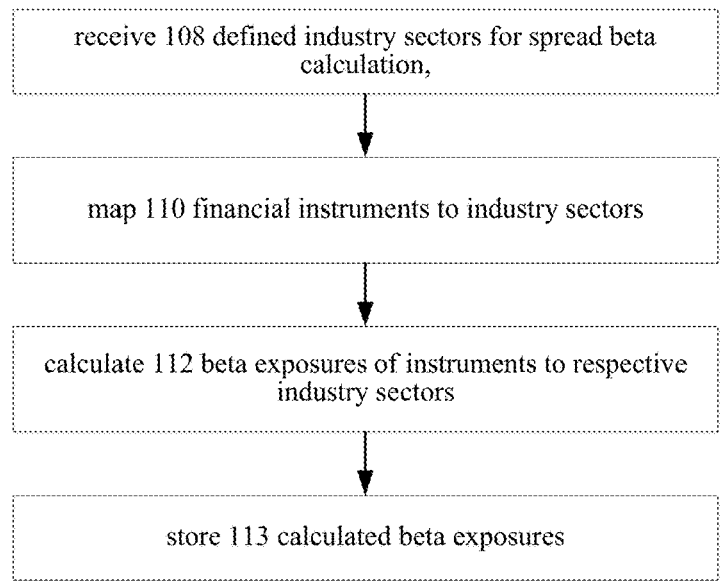
Figures 4, 5B:
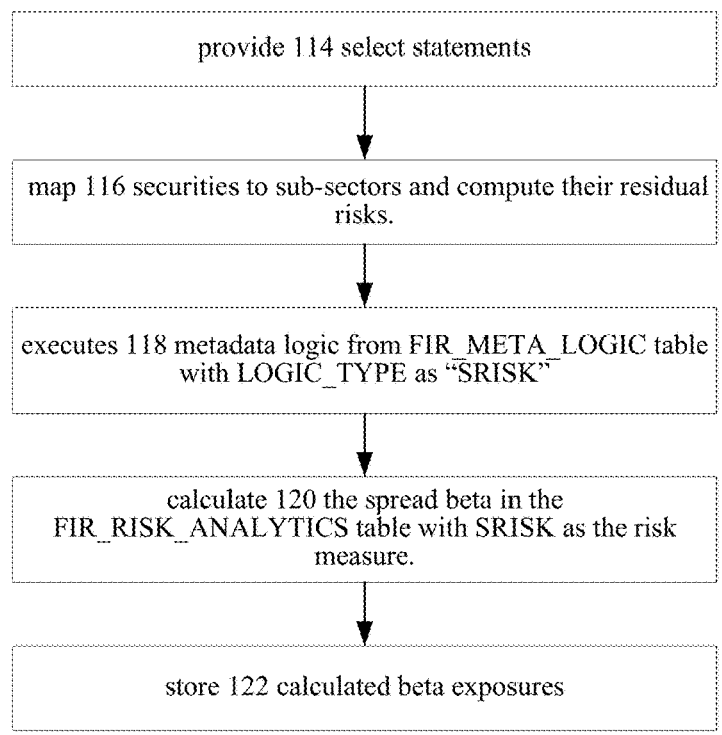

Referring now to FIG. 5B-1, the system 10 receives one or more investment portfolios each comprised of a plurality of financial instruments. The system 10 receives 102 financial instrument reference and analytics data for those instruments. The system 10 maps 103 the financial instruments to risk factors in the risk models, and calculates 104 security level linear risk factor exposures and stores 105 the calculated linear risk factor exposures. Examples of mapping of securities and risk factors, and calculating of the factor exposures are shown below.

The following metadata example maps instruments with a one year key rate duration to a one year treasury rate risk factor, e.g., US treasury for instructions denominated in dollars, Japanese treasury for Yen denominated, etc.

select ir.fi_instrument_id as fi_instrument_id,
    1 as factor_id,
    ia.enh_key_rate_duration_1 as exposure
    from instrument_refernce ir, instrument_analytics ia
    where ir.fi_instrument_id =ia.fi_instrument_id and
    ir.pricing_dt =ia.pricing_dt and
    ia.enh_key_rate_duration_is not null and
    ir.pricing_dt ='8apr2011'

Cube Calculation for Non-Linear Factors

Referring now to FIG. 5B-2, the system 10 identifies 106 securities, etc. that have non-linear risk factors, such as CMBS securities. The system calculates 107, for all markets in a given simulation, simulated returns for non-linear risk factors for the financial instruments (e.g., for CMBS the system calculates CMBS Loss factor returns) having exposures to such non-linear risk factors using calculation logic in the metadata risk factor modules, and stores 107 the calculated returns.

The following metadata example populates the CMBS Loss risk factor returns for all CMBS instruments based on loss durations.

```
select 1 AS sim_id,
   ir.fi_instrument_id as fi_instrument_id,
   sim1.simulation_id AS market,
   21 as factor_id,
   GetCMBSReturn(sim1.factor_value, tds.loss_dur_0_5,
tds.loss_dur_5_10,   tds.loss_dur_10_20,   tds.loss_
dur_O_M5, tds.loss_dur_m5_m10, tds.loss_dur_m10_m20,
tds.spread_dur, sim2.factor_value) AS return
   from INSTRUMENT_reference ir, tev_data tds, simula-
tion_factorvalue simi, simulation_factor_value sim2
   where ir.LB_CLASS2_CD ='DC' and
   ir.FI_INSTRUMENT_ID =tds.INSTRUMENT_ID and
   tds.PRICING_DATE =ir.PRICING_DT and
   sim1.simulation_type ='ts' and
   sim1.sim_date =ir.PRICING_DT and
   sim1.horizon_id =2 and
   sim1.factor_id =19 and
   sim2.factor_id =13 and
   sim1.simulation_id =sim2.simulation_id and
   sim1.simulation_type =sim2.simulation_type and
   sim1.sim_date =sim2.sim_date and
   sim2.horizon_id =sim2.horizon_id and
   ir.PRICING_DT ='08apr2011'
```

The following example metadata SQL defines the classification logic for CMO (Collateralized Mortgage Obligations) sector. The sector is classified with sub-sectors up to five levels. The sub-sectors detail the breakdown of CMO sector based on the instrument age, collateral structure and price bucket.

```
select ir.fi_instrument_id, 2, 'CMO', 'FNCL', 'FHR',
'SEASONED', 'PREMIUM', ",", from instrument_refer-
ence ir where ir.lb_class2_cd ='DE'and ir.collateral_
structure ='FNCL' and bloomberg_ticker ='FHR' and (sys-
date —dated_dt) /30 >48 and fmr_price >104
```

Each unique sector row is assigned a unique sector id in this FIR_SEC_SECTOR table.

Spread Beta Calculation

Referring now to FIG. 5B-3, the system 10 receives 108 defined industry sectors for spread beta calculations, maps 110 the financial instruments in the set of instruments, e.g., all investable instruments, to industry sectors and calculates 112 credit spread beta of such instruments to their respective industry sectors and stores 113 the calculated exposures. The following is an example of a spread beta calculation 112 for Barcap (Barclays Capital's industry sector classification) BAA (government guaranteed securities).

```
select greatest (0, (tb.sys_ALPHA+tb.sys_GAMMA*sqrt
(least (5, greatest (—5, ia.LIBOR_OAS/tb.PARENT_LI-
BOR_OAS)))* tb.sys_LAMBDA
   from
   tev_betas tb, instrument_analytics ia, instrument_refer-
ence ir
   where
   tb.LB_CLASS3_CODE =ir.LB_CLASS3_CD and
   ir.LB_CLASS3_CD ='BAA' and
   ir.FI_INSTRUMENT_ID =ia.FI_INSTRUMENT_ID and
   ir.PRICING_DT =ia.PRICING_DT
```

Residual Risk Calculation

Referring now to FIG. 5B-4, the following is an example of a residual risk calculation for barcap classification BAA, (Government guarantee securities).

```
select greatest (0, (tb.se_ALPHA+tb.se_GAMMA*sqrt
(least (5, greatest (–5, ia.LIBOR_OAS/tb.PARENT_LA-
BOR_OAS)))*tb.se_LAMBDA
   from
   tev_betas tb, instrument_analytics ia, instrument_refer-
ence ir
   where tb.LB_CLASS3_CODE =ir.LB_CLASS3_CD
   and ir.LB_CLASS3_CD ='BAA'and
   ir.FI_INSTRUMENT_ID =ia.FI_INSTRUMENT_ID and
   ir.PRICING_DT =ia.PRICING_DT
```

Residual risks are assumed to have perfect correlations within the subsector and have zero correlations between subsectors. Thus, to simplify the aggregation process, pre-aggregate residual risk for all the funds at the sub-sector level. The following SQL statement illustrates how to aggregate portfolio's subsector level residual risk.

```
select aw.fund_cd, tb.sector_id,
   sum (aw.pmv * greatest (0, (tb.SE_ALPHA+tb.SE _
GAMMA*sqrt (least (5, greatest( –5, ia.LIBOR_OAS/tb.
PARENT_LIBOR_OAS)))*tb.SE_LAMBDA srisk
   from
   tev_betas tb, instrument_analytics ia, instrument_refer-
ence ir, active_wt aw
   where tb.LB_CLASS3_CODE=ir.LB_CLASS3_CD
   and                    ir.LB_CLASS3_CD='BAA'and
ir.FI_INSRTUMENTID=ia.FI_INSRTUMENT_ID
   and ir.PRICING_DT=ia.PRICING_DT
   tev_betas tb, instrument_analytics ia, instrument_refer-
ence ir
   where tg.LB_CLASS3_CODE=ir.LB_CLASS3_CD
   and                    ir.LB_CLASS3_CD='BAA'and
ir.FI_INSRTUMENT_ID=ia.FI_INSTRUMENT_ID
   and ir.PRICING_DT=ia.PRICING_DT
   group by aw.fund_cd, tb.sector_id
```

The approach provides high performance and a high degree of flexibility and scalability. For example, while batch operations are performed on (flexible and scalable) name-value-pair data representations, interactive operations are performed on (better performing) wide, multicolumn representations. Another example is the representation of all important calculations as user-defined metadata that are translated into high performance calculations and queries by dynamically generating ANSI SQL modules.

The system 10 provides flexibility in risk calculations including support for execution of multiple risk models and multiple model versions in risk calculations. The system 10 enables full valuation of securities in simulation-based risk calculations and provides support factor level and sector level risk attributions using contribution and marginal contribution risk measures. For sector level risk attribution, the system enables defining of sector schema using a limited set of security reference data such as Barcap classifications level 1 through level 4, trading currency code and credit ratings. For factor level risk attribution the system enables users to define factor groups and with factor groups, factor group level risk measures can be calculated. The system 10 enables users to define groups for funds and produce risk analysis of group of funds.

The system 10 provides flexibility in changes to a risk model by using metadata modules to store risk factor logic as opposed to hard-coding prior art approach of using a stored procedure or a software based risk model written in a high-level programming language. As the metadata modules include factor mapping, factor exposure calculation logic, and factor return calculation logic this enables the metadata module to calculate spread beta and define the mapping logic, as discussed below. The system 10 provides support for complex non-linear factors. The system 10 provides support for on-demand risk calculations for what-if and scenario analysis in addition to the batch-based risk calculations. The system 10 also provides support for risk analysis on multiple risk models or multiple versions of a risk model on existing portfolios, as discussed below.

The system 10 can calculate security level exposures and portfolio level risk measures concurrently. The system 10 enables reuse of the concurrent processing framework for both batch and on-demand risk calculations. The system 10 separates risk model calculations from risk aggregation and can accommodate the growth in data size and calculation volume.

Figure 5C:
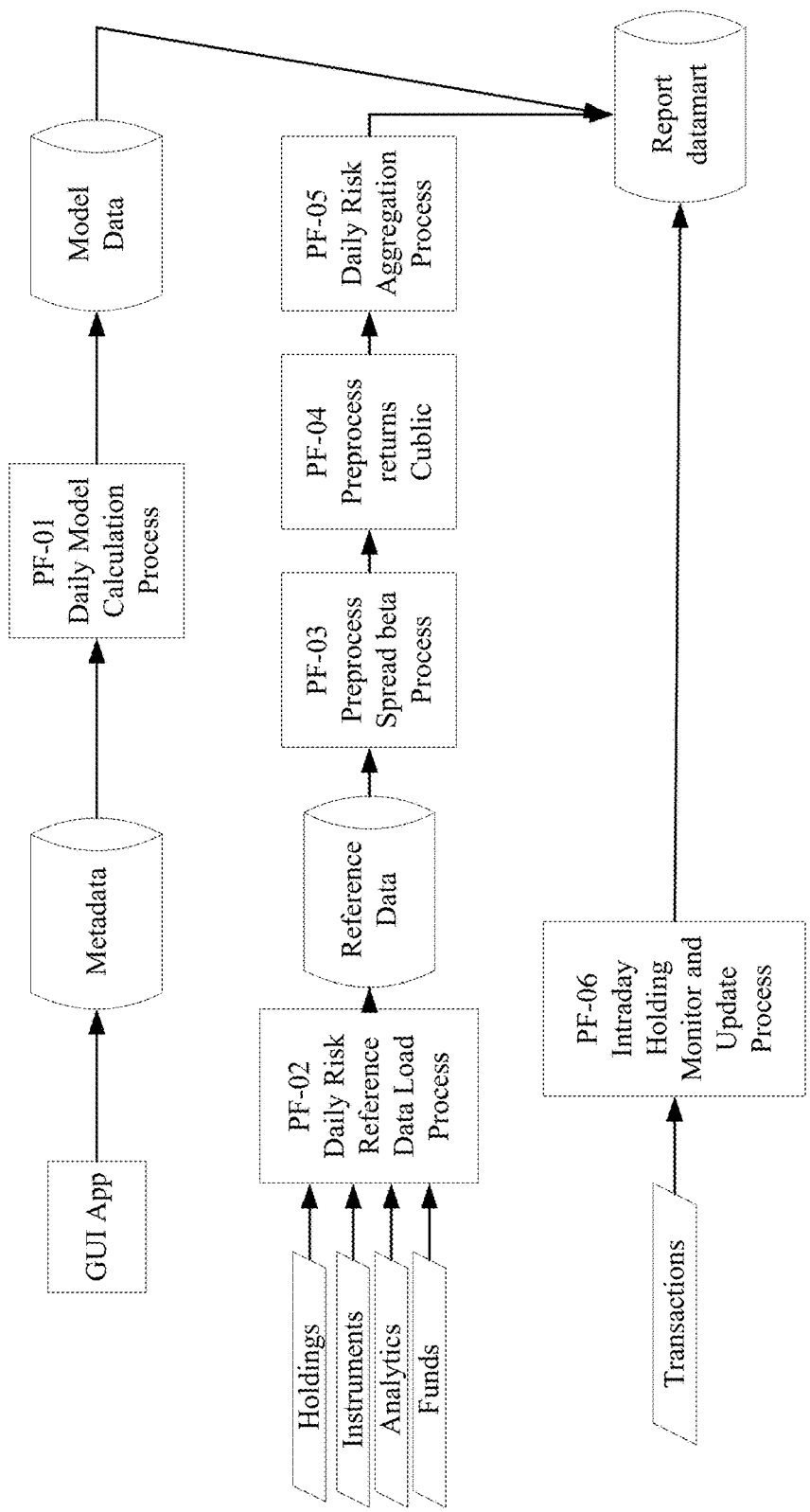
FIG. 5C is a flow diagram depicting a process flow.

Referring now to FIG. 5C, an exemplary process flow is shown. PF-01 is a daily Model Calculation Process that computes factor exposures for all risk factors in parallel, as discussed above. PF-01 uses as input the metadata definitions, discussed above and typically can be invoked though a GUI app, as discussed below.

PF-02 is a daily Risk Reference Data Load Process that provides reference data (e.g., holdings, instruments, analytics, funds) used for pre-processes, such as spread beta and returns cube processes. PF-03 is a preprocess spread beta process that calculates spread betas using raw instrument analytics sourced from the datamart, as discussed above in Spread Beta Calculation. PF-04 is a preprocess returns cube that calculates intermediate returns for non-linear factors, calculates intermediate returns for linear factors and adds non-linear and linear factors to produce an N×S returns cube, where N is the number of instruments and S is the number of market scenarios. PF-05 is a daily risk aggregation process that calculates TEV risk measures for the funds in parallel. PF-06 is an intra-day holdings monitor and update process that monitors transactions on holdings on an intra-day basis. For any updates that are detected the process communicates with the GUI to display the changed status to users and updates the risk report datamart. Each of the model data, PF-05 and PF-06 processes input to the report datamart.

Risk Calculation Example

Figure 6:
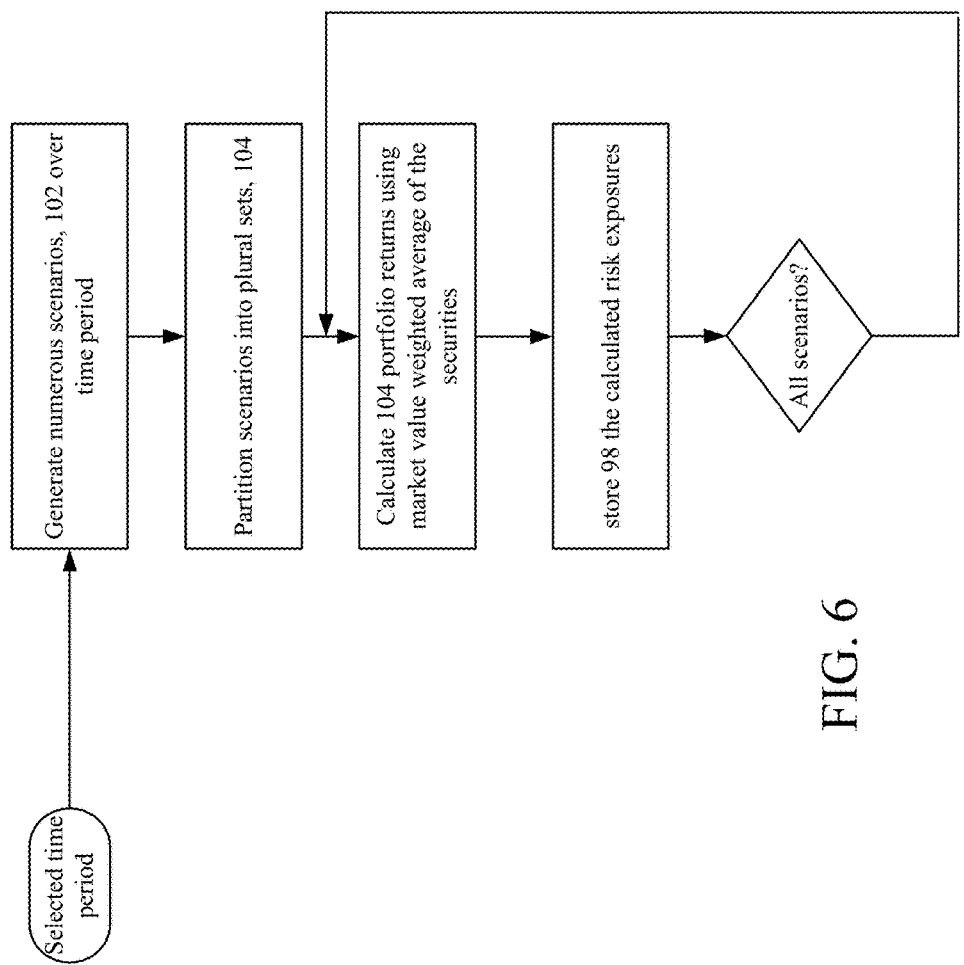
FIG. 6 is flow chart depicting risk exposure calculation over plural scenarios.

Referring now to FIG. 6, a risk calculation example is shown. The risk of a portfolio is defined as one standard deviation of the portfolio's returns under the simulated markets. Similarly, the active risk of a portfolio is one standard deviation of its active returns relative to its assigned benchmark. The system 10 generates numerous, e.g., 250,000 (or more) future market scenarios 102 for a given investment time period.

A set of risk factors are used to describe the market scenarios. For each market scenario, the set of risk factor are "shocks" that are applied to the current market scenarios. In the implementation of the system 10 these risk factors are provided as metadata risk factor modules, and a set of these metadata risk factor modules describes the risk factor model used to model the market scenario. The estimate of returns for a portfolio is based on those market scenarios and will have a distribution of the number of simulations that were run for a set, which in the example described here is 100,000 simulations and thus will have a set of 100,000 returns. These portfolio returns are calculated 104 using market value weighted average of the securities held using the following formula implemented in the calculation logic of the metadata risk factor definitions.

$$Rtn(P) = \sum_{i=1}^{n} Wt \times Rtn(i) \tag{1}$$

where n is the number of securities in the portfolio P, Rtn(t) is the return on the $i^{th}$ security, Wi is the percentage of total portfolio return value comprised by the $i^{th}$ security, and Rtn(P) is the return for portfolio P.

Security returns are calculated using the simulated markets either by full valuation or by approximation. Full valuation would run through the instrument level valuation model and take the simulated markets as the input to produce a price and a return. Based on the assumption of 100,000 simulated markets, this approach, while requiring extensive calculations, can capture all of the non-linear effects from all the risk factors.

For securities requiring full valuations, the returns are pre-calculated and persisted to the non-linear return cube table (FIS_SIM_CUBE_NL). In implementing formula (1) to aggregate the portfolio level returns, the process uses the instrument level returns calculated with full valuation when available.

When full valuations are not available in the FIS_SIM_CUBE_NL table, a modified formula for Taylor Series expansion can be used to approximate the security return. There are linear and non-linear risk factors. For a security which is sensitive to m linear factors f and k non-linear factors F, its return can be expressed in the metadata calculation logic as the following $$Rtn(t) = \sum_{f=1}^{m} Rtn(t, f) + \sum_{E=1}^{k} Rtn(t, F) \tag{2}$$

where Rtn(t,f), is the return attributable to the $f^{th}$ (linear) factor, Rtn(t,F) is the return attributable to the $F^{th}$ (non-linear) factor. For linear factors, the following formula is used to aggregate the factor returns.

$$Rtn(i, f) = \sum_{f=1}^{m} \text{Exp}(i, f) * Rtn(f) \tag{3}$$

where Exp(i,f) is the exposure of the $i^{th}$ security to the $f^{th}$ factor, and Rtn(F) is the simulated value of the $f^{th}$ factor. Exp(i,f) is stored in the FIS_FACTOR_EXPOSURE table and Rtn(f) takes on the 100,000 simulated values for the $f^{th}$ factor stored in FIS_SIM_FACTOR_RETURN table.

For non-linear factors, the factor returns for securities are pre-calculated and stored in the FIS_SIM_CUBE_NL table for all the markets. Return calculation becomes a simple lookup to the non-linearcube table.

While the model has a convexity factor which captures the return sensitivity to changes in curvature of yield curve, the $2^{nd}$ order (or square term) term of the return expression itself is calculated and persisted in the FIR_SIM_FACTOR_RETURN table for the ease of implementation.

For financial instruments that are classified as "cash instruments" with no leverage involved, the aggregation engine also puts a floor on the security returns based on its market value weight (e.g. a security's return is no more than 100%, or its new market value weight should never be negative)

One standard division of the factor returns becomes the common factor risk. Portfolio risk is a sum of its common factor risk and its specific risk.

$$AR(P') = \sqrt{AR(\text{common factor})^2 + SR(P)^2} \quad (4)$$

AR(P) represents the active risk of portfolio P. AR(common factor) represents the active risk from portfolio's common risk factors. SR(P) represents portfolio's specific risk.

Specific risk has perfect correlations within their respective subsectors. Across sectors, specific risk has zero correlations.

$$SR(P) = \sqrt{\sum_{s=1}^{n} SR(s)^2} \quad (5)$$

SR(P) is the portfolio P's specific risk. SR(s) is the sector level specific risk for Portfolio P.

$$SR(s) = \sum_{t=1}^{n} SR(t') * w(t) \quad (6)$$

Risk Calculation Approaches

The logic for the risk calculations is stored as user-defined metadata, as discussed above and can be changed from time to time as the system 10 is used. Details of the calculations are discussed above. Moreover, a number of considerations relating to the environment in which those calculations are executed are considered since those considerations can significantly affect performance, flexibility, and maintainability. Those considerations include:

TEV Calculation Approaches

There two main approaches involved in TEV calculation.

Statistical approach: For each security in a portfolio, compute the products of risk sensitivities, simulation risk movements, and portfolio active weights. Sum across the factors, obtaining a returns vector of length N, where N is the number of securities in the portfolio. Finally, calculate the standard deviation of this vector to obtain the TEV.

Analytic approach: TEV can also be calculated using the risk sensitivities together with the covariance matrix for the simulations.

In addition to these approaches, future approaches may include portfolio optimization, PCA or analytic methods such as alpha-seeking.

Name-Value Pairs vs. Wide Tables

The performance of calculations in the risk calculation engine may depend on the choice of name-value pairs vs. wide table implementation. This matter is discussed in detail in Appendix G: The Balance between Flexibility and Performance. Normalization and De-normalization SQL, UDX, nzMatrix, and R For many of the calculations required by the risk engine, the system 10 provides several different implementation alternatives.

SQL: The High performance database server platform makes SQL queries on large tables run as fast as possible. High performance database server provides extensive utilities and documentation to help developers make SQL high performance in various situations. For these reason, implementing calculations in SQL is an appropriate default choice.

UDF: The latest version of High performance database server (v. 6) provides users with the ability to implement calculations as C++ programs, called user defined functions, or UDF's which then execute in parallel on each node in the High performance database server appliance. UDX's are used together with SQL, typically as clauses in select statements, much as one would use built in functions such as stddev or random. In some situations UDF's are a better-performing option than the equivalent calculation implemented as straight SQL. UDF's can be compiled in two different modes: "fenced" is appropriate for development and debugging, but carries a performance penalty while "unfenced" is fast and appropriate for tested production code. UDF's may also be appropriate for calculations that are difficult or awkward to implement as set operations in SQL.

nzMatrix: Another new capability provided by High performance database server is the matrix package nzMatrix. This package includes functions to translate between name-value tables and matrix representations, along with many matrix manipulation functions.

R: High performance database server now includes an implementation of the statistics language R. Quant analysts are familiar with R; R is used, for example to calculate the Monte Carlo simulation data that is used by the Risk engine.

With this arrangement, the needs to transmit data outside of the database storage to a different computational platform written in conventional programming language such as C, C++, Java, Matlab, R, Splus or Visual Basic are eliminated thus permitting superior performance while reducing system 10 complexity Order of Matrix Operations In some cases of interest, the order of matrix operations can have a very significant effect on performance.

Consider the following scenario:

A, B, and C are floating-point matrices.

Matrix A has dimensions 160000×27.

Matrix B has dimensions 27×27.

Matrix C has dimensions 160000×1.

Now suppose it is desired to calculate $A \times B \times A^T \times C$.

If the calculations are performed in order, from left to right, the second multiplication will result in a matrix of dimensions 160000×160000, containing 25.6 billion floating-point numbers. In this case, the calculation will likely to spend a great deal of time performing disk I/O.

If, however, if the calculation is performed as follows, $(A \times B) == D,$ $(A^T \times C) == E,$ Result is D×E, then none of the intermediate matrices is larger than 160000×27, and disk I/O is reduced by a large factor.

The numbers are not arbitrarily chosen, the calculation is representative of a TEV calculation for a moderately sized portfolio, and by changing the order of operations, a significant performance increase is obtained. The degree of performance increase is related to the square of the number of securities in the portfolio, and so increases dramatically with the portfolio size. Savings from well-chosen order of operations are between 4-fold and 60-fold.

Cube vs. On-The-Fly

Storage of the factor returns for every financial instrument for all the different types of simulations and time periods results in an extremely enormous quantity of data. For 160 thousand securities, 100 risk factor, 4 types of simulations each with 3 different horizons, the cube would require 19.2 trillion records. If each number requires 4 bytes of storage, 76 TB of storage is required to store the simulation results for one day.

Another approach is to use the cube only for a smaller set of securities which requires full valuation or for risk factors which are non-linear and has complex return logic. The aggregation engine would perform on-the-fly aggregation for all linear risk factors by using factor exposure multiply factor returns and perform a look up to the cube full valuations and for non-linear risk factors.

Techniques such as data distribution and broadcast are used to ensure the sql execution plans for on-the-fly calculations utilize the computing power on all the blades.

Risk Decomposition aggregations are defined at the following two levels Factor Level and Sector Level but may be extended to include more attributes or groupings:

The Risk Decomposition can be run in two modes:

Batch

The aggregation functions shall be run as part of the daily batch process to calculate the marginal and total contributions for factor/sector and store the output into the RISK datamart.

Interactive or On-Demand

The Aggregation functions can interface with the corresponding webservice calls to provide the metrics on demand for intraday requests or when the business users run the what-if scenarios to evaluate/decompose the impact of decisions at different aggregate/drilldown levels for their respective funds. The results will also be stored into the Risk datamart for future reference. The logic used for risk decomposition will remain the same for both Batch and Interactive.

Batch Parameter Table

On demand risk calculations and the batch based risk calculations use a single batch parameter entry table, the Batch Parameter Table. The batch parameters table feeds all components of the risk engine including the risk calculation, risk decomposition along various dimensions such as factors, industry sectors, tickers or issuers, and instrument as well as risk aggregation at the portfolio level. The enterprise batch process leverages the parameter table to calculate multiple sets of risk measures for hundreds of portfolios concurrently, while the on-the-fly risk calculation process uses the parameter table for "ex-ante" risk calculations of "what-if" scenarios. In addition, the system maintains a history of the enterprise batch parameters table enabling analysis of the batch coverage and risk calculation assumptions by reviewing the calculation parameters for any point in time.

Factor Level Aggregation

Figure 7B:
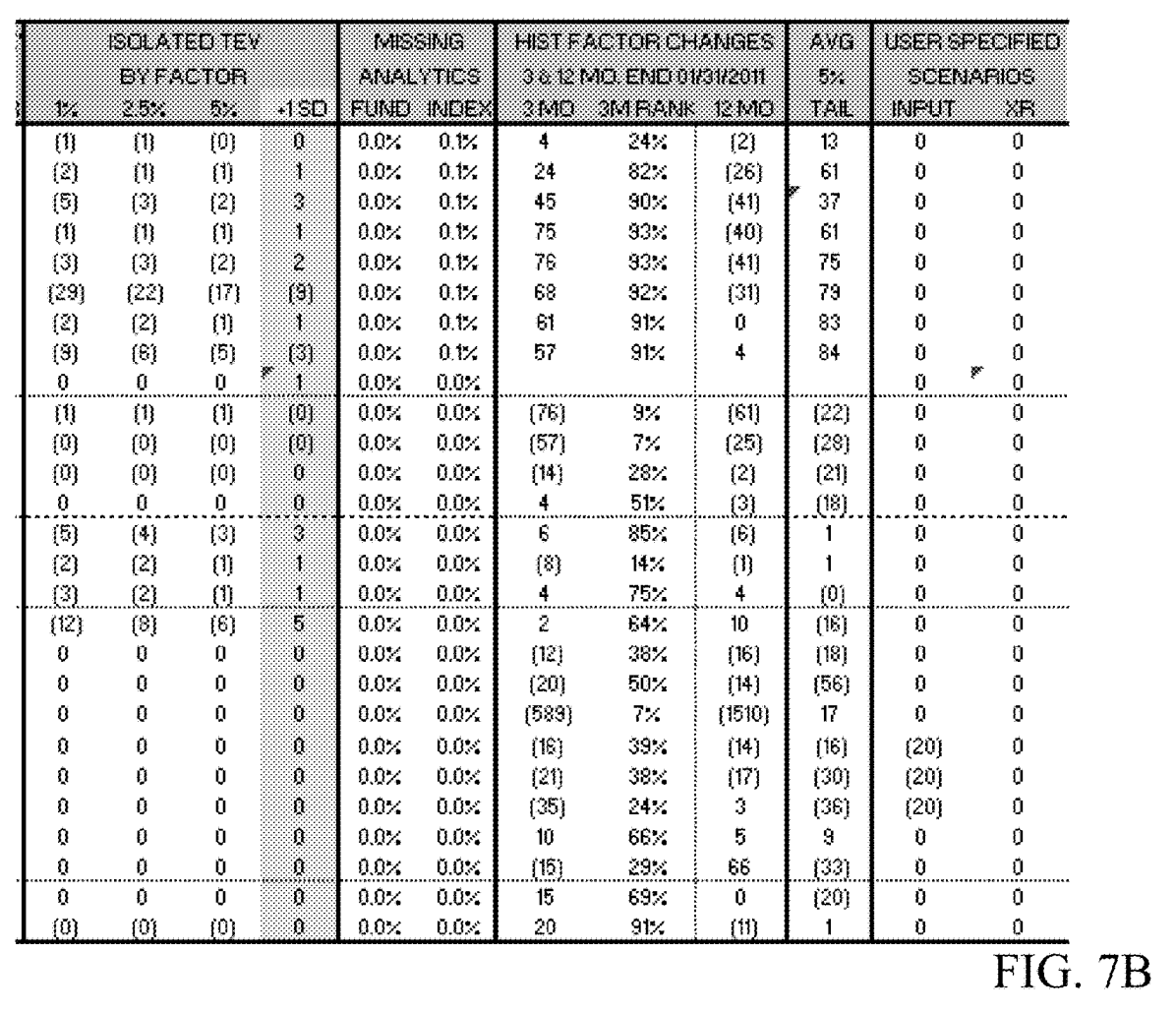

Referring now to FIGS. 7A, 7B, an exemplary report depicts the factor level aggregation decomposes the risk at the risk factor level for a given FUND/INDEX combination to calculate the respective contributions, as shown.

Following are metrics for the factor level aggregations:
Contribution to Factor Durations
Factor Volatilities
Contribution to TEV by Factor
ISOLATED TEV by Factor
Missing Analytics
Historical Factor Changes
Average 5% Tail The logic for factor level aggregation comprises of the following modules that calculate the respective metrics and populate the RISK datamart.

Web Services

A web services layer acts as single entry point for visualization tools to access risk data in the system 10. The web service layer exposes functions required by visualization tools that pass parameters to the service and receive data.

Approach

The visualization tools would send parameters to web service in a specific format. The web service layer returns data to the visualization tool in a standard format (XML & JSON). The web service is metadata driven meaning that the logic for extracting data is configurable and would generally not require any coding changes.

Workflows

The web service is called by front-end tools when data needs to be fetched from the database. The front end tools can be any kind of application, an Excel interface, a web based platform, a Windows Presentation Foundation (WPF) client and so forth. The application passes input parameters (e.g., fund, security etc.) and receives data in a data format.

Metadata Driven Services

New services are defined or the services can gather data from different sources. To enable this requirement, the web service is managed by using a metadata model. The metadata is stored in a database table that defines the webservices URL and backend data that is needed for that URL.

The table used is risk_func_mapping and has the following structure

PRODUCE TABLE BI_USER.RISK_FUNC_MAPPING
(
   SERVICE_ID INTEGER NOT NULL,
   SERVICE_NAME CHARACTER VARYING(30) NOT NULL,

Batch Parameter Table

| BASE CURRENCY ID | MODEL ID | SIM ID | SIM DATE | CLASS ID | FUND CD | INDEX CD | PRICING DATE | INDEX UNIVERSE | MODEL STATUS |
|---|---|---|---|---|---|---|---|---|---|
| USD | 2 | 8 | Dec. 30, 2020 11 0:00 | 6 | AAA | LB001 | Jan. 24, 2012 0:00 | RU | −1 |
| USD | 2 | 6 | Dec. 30, 2020 11 0:00 | 3 | BBB | — | Jan. 24, 2012 0:00 | RU | −1 |
| USD | 3 | 10 | Dec. 30, 2020 11 0:00 | 2 | CCC | LB021 | Jan. 24, 2012 0:00 | RU | 0 |
| USD | 3 | 11 | Dec. 30, 2020 11 0:00 | 6 | DDD | — | Jan. 24, 2012 0:00 | RU | 0 |
| EUR | 2 | 6 | Dec. 30, 2020 11 0:00 | 3 | EEEE | LC016 | Jan. 24, 2012 0:00 | RU | −1 |

```
SERVICE_FUNCTION CHARACTER VARYING
    (2000) NOT NULL
)
DISTRIBUTE ON (SERVICE_ID);
```

The service_name column defines the URL and the agg_function defines the query to be fired when the request is received on the URL.

Data Mapping

The service layer uses the risk_func_mapping to map the URL to the underlying operation. The table structure is as described above.

Risk Resource is configured to handle all requests. The Risk Resource validates if it is a request it can handle, by querying risk_func_mapping table. If there is an entry for the request the corresponding service function is pulled. Parameters expected by the query are mapped to the parameters sent as part of the request, if there is a mismatch the service exits. If the parameters match, the service_query is fired with the user parameters and the results are returned to the Risk Resource.

Concurrency and Multi-Threading

Concurrent Transactions

For scalability and performance it is useful for an application to have multiple independent connections called concurrent transactions. Using concurrent transactions, an application can connect to database (s) at the same time, and can establish several distinct connections to the same database. Another benefit of concurrent transactions is that if the work on the cursors in one connection is rolled back, it has no effect on the cursors in other connections. After the rollback in the one connection, both the work done and the cursor positions are still maintained in the other connections.

Risk Database Classifications

ENTERPRISE

This database will hold daily reference, price and holdings data

FI_PORTFOLIO_DM

This database will hold portfolio datamart values for instruments, analytics, holdings and lot level

FI_APPL

This database will hold metadata value for risk and other application product

| Exemplary Database Server Appliance Configurations | | | | | |
|---|---|---|---|---|---|
| | TF3 | TF6 | TF12 | TF24 | Other systems |
| Racks | 1 | 1 | 1 | 2 | 3-10 |
| S-Blades | 3 | 6 | 12 | 24 | # Racks × 12 |
| CPU Cores | 24 | 48 | 96 | 192 | # Racks × 96 |
| User Data in TB(Uncompressed) | 8 | 16 | 32 | 64 | # Racks × 32 |

One exemplary database server appliance for the database implementation is a Netezza high capacity appliance, database server from Netezza, an IBM Corporation (Armonk N.Y.). Other database servers could be used. For some aspects other server types could be used. Servers can be any of a variety of computing devices capable of receiving information, such as a server, a distributed computing system 10, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory. A bus system 10 (not shown), including, for example, a information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules information for the rules, software for the rules engine, etc.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input information and generating output. The invention can be implemented advantageously in one or more computer programs that are executable on a programmable system 10 including at least one programmable processor coupled to receive information and instructions from, and to transmit information and instructions to, a information storage system 10, at least one input device, and at least one output device. Computer programs can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

A number of embodiments of the invention have been described. Nevertheless, it is understood that various modifications may be made without departing from the spirit and scope of the invention. Accordingly, other embodiments are within the scope of the following claims.

What is claimed is:

1. A database system comprises:
   a first storage system storing a description of a multi-factored risk model as a set of rules and logic operations, with the description mapping financial instruments to risk exposure factors;
   a plurality of processor engines configured to execute the multi-factor risk model to calculate values of investment portfolios in response to a market event, at least some of the plurality of processor engines further configured to:
   retrieve from a second storage system have a storage medium, data for use with the multi-factor risk model, the data including historical and intraday reference data for financial instruments, portfolios, financial indexes, intraday information on new financial instruments included in a portfolio, sector and classification data and analytic data;
   a first portion of the plurality of processor engines configured to:
   calculate values of risk exposure factors of portfolios based on the stored multi-factor risk model, the risk exposures stored in storage structures by the first portion of engines, and
   a second portion of the plurality of processor engines configured to:
   query the storage structures that store the calculated risk exposures factor values, to provide inputs to the multi-factor risk model; and
   calculate the risk exposures of the portfolios based on the inputs to the multifactor risk model.

2. The system of claim 1 wherein the second portion of engines execute queries to return results for different types of aggregation scenarios according to a type of multifactor risk model.

3. The system of claim 1 wherein the second portion of engines execute queries to return results from the second storage system for different types of aggregation scenarios.

4. The system of claim 1 wherein the first portion of engines calculates linear exposure factors, and stores results from linear exposure calculations into a corresponding table structure in memory, which is associated with the processor engines.

5. The system of claim 1 wherein the first portion of engines calculates non-linear exposure factors and stores results from the non-linear exposure calculation into a corresponding table structure in memory that is associated with the processor engines.

6. The system of claim 1 further comprising:
   a host system comprising one or more processors and memory in communication with the one or more processors, the host system further in communication with the second storage system to retrieve from the second storage system, the data for use with the multifactor risk model when the at least some of the plurality of processor engines are unable to support processing for a particular task involving that data.

7. The system of claim 1 further comprising a report generator to generate reports based on the results stored by the second portion of engines.

8. The system of claim 1 further comprising:
   an engine to execute a process to periodically load the second storage system with the reference data for the multi-factor risk models from other data sources.

9. The system of claim 1 wherein a type of the multi-factor risk models is selected from the group consisting of a historical parametric model, a historical simulation model and a Monte Carlo model.

10. The system of claim 1 further comprising:
    a host system comprising processor and memory, the host system configured to:
    compile SQL queries into executable code segments to produce query plans to query the second storage system;
    retrieve calculated values from execution of the multi-factored risk model; and
    manage distribution of queries to the second portion of processor engines for execution of the queries.

11. A system comprises:
    a storage system that stores a plurality of multi-factored risk models with the plurality of multi-factored risk models stored as a plurality meta logic risk factor modules that comprise executable meta logic, the multi-factor risk models to model risk exposures to portfolios of securities based on at least two risk factors that impact returns or prices of the securities in the portfolios;
    a plurality of processor engines configured to:
    retrieve from the data storage system data to input to the multi-factor risk models; and with the plurality of processor engines, further configured to have:
    a first portion of the processor engines configured to execute the meta logic in corresponding risk factor modules for the securities in the respective portfolios; and
    a second, different portion of the processor engines configured to calculate a defined set of risk measures for a defined set of investment portfolios and benchmarks to provide inputs to the multi-factor risk model to calculate risk exposures of the portfolios.

12. The system of claim 11 wherein the models include linear risk factors implemented as the meta logic, and with calculated returns for the linear risk factors being aggregated for all securities in the portfolios according to the positions within the respective portfolios.

13. The system of claim 11 wherein the models include non-linear risk factors implemented as the meta logic, and with calculated returns for the non-linear risk factors being aggregated for all the securities in the portfolios according to the positions within the respective portfolios.

14. The system of claim 11 wherein non-linear factor simulated returns are calculated and stored into a corresponding table structure.

15. The system of claim 11 further comprising a web service layer to provide user interfaces to connect to the database server and to execute procedure calls to the second portion of risk processing engines to calculate the risk factors.

16. The system of claim 11 further comprising a report generator to generate reports based on the results stored by the second portion of engines.

17. The system of claim 11 wherein the storage system and the plurality of processor engines are part of a high performance relational database server, and the system further comprises:
    a relational database schema that stores the data to input to the multi-factor risk models in the relational database; and an engine to execute a process to periodically load the database with reference data for the multi-factor risk models from source databases.

18. The system of claim 11 wherein a type of the multi-factor risk models is selected from the group consisting of a historical parametric model, a historical simulation model and a Monte Carlo model.

19. A system comprises:
a first storage system storing a multi-factored risk model that models values of investment portfolios in response to a market event;
a second storage system having a storage medium that stores data for use with the multifactor risk model, the data including historical and intraday reference data for financial instruments, portfolios, financial indexes, intraday information on new financial instruments included in a portfolio, sector and classification data and analytic data;
a plurality of processor engines configured to execute the multi-factor risk model;
a first portion of the processor engines configured to calculate from the multifactor risk model in the first storage system, values of risk exposures based on the multi-factor risk model, the calculated values of risk exposures stored in the second storage system by the first portion of engines;
a second portion of the processor engines configured to query the second storage structures that store the calculated values of risk exposures to provide inputs to the multi-factor risk model to calculate risk exposures of the portfolios; and
a host system that compiles SQL queries into executable code segments to produce query plans to query the second storage structure to retrieve calculated risk exposures from execution of the multi-factored risk model and manages distribution of queries to the second portion of processor engines for execution of the queries.

20. The system of claim 19 wherein the host system configures the system to query the second storage system when the second portion of the processing units is unable to support parallel processing for a particular task.

21. The system of claim 19 wherein the second portion of engines execute queries to return results from the second storage system for different types of aggregation scenarios according to a type of multifactor risk model.

22. The system of claim 19 wherein the first portion of engines calculates linear exposure factors and stores results from linear exposure calculations into a corresponding table structure in memory associated with the processor engines.

23. The system of claim 19 wherein the first portion of engines calculates non-linear exposure factors and stores results from the non-linear exposure calculation into a corresponding table structure in memory associated with the processor engines.

24. The system of claim 19 further comprising a web service running on the host to provide user interface services to connect to the system.

25. The system of claim 19 further comprising a report generator to generate reports based on the results stored by the second portion of engines.

26. The system of claim 19 further comprising:
an engine to execute a process to periodically load the second storage system with reference data for the multi-factor risk models from source databases.

27. The system of claim 19 wherein a type of the multi-factor risk models is selected from the group consisting of a historical parametric model, a historical simulation model and a Monte Carlo model.

28. A computer implemented method, the method comprising:
retrieving data from a storage system by a server system that comprises a plurality of processor engines, each processor engine having at least one processor device and memory in communication with the at least one processor device, the data including historical and intraday reference data for financial instruments, portfolios, financial indexes, intraday information on new financial instruments included in a portfolio, sector and classification data and analytic data;
calculating by a first portion of the plurality of processor engines of the server system risk exposures of portfolios based on a multi-factor risk model, the risk exposures stored in storage structures by the first portion of engines; and
querying by a second, different portion of the processor engines of the server system, according to the multifactor risk model the storage structures that store the calculated risk exposures to provide inputs to the multi-factor risk model to calculate the risk exposures of the portfolios according to the multifactor risk model.

29. The method of claim 28 further comprising:
aggregating results returned by the second portion of engines executing queries according to a defined aggregation scenario according to a selected type of multi-factor risk model.

30. The method of claim 29 wherein the multi-factored risk model is stored in the storage system and with the multifactor risk model implemented as an assembled series of meta logic modules.

* * * * *